United States Patent
Hatano et al.

(10) Patent No.: US 7,840,487 B2
(45) Date of Patent: Nov. 23, 2010

(54) DIGITAL CONTENT ENCRYPTION AND DECRYPTION METHOD AND WORKFLOW SYSTEM USING DIGITAL CONTENT

(75) Inventors: Yasuo Hatano, Yokohama (JP); Kunihiko Miyazaki, Yokohama (JP); Kenji Matsumoto, Yokohama (JP); Yoji Shimizu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 470 days.

(21) Appl. No.: 11/706,430

(22) Filed: Feb. 15, 2007

(65) Prior Publication Data

US 2007/0219915 A1    Sep. 20, 2007

(30) Foreign Application Priority Data

Feb. 20, 2006  (JP)  ............................ 2006-041813
Dec. 28, 2006  (JP)  ............................ 2006-353690

(51) Int. Cl.
  *G06F 21/00*  (2006.01)
(52) U.S. Cl. ............................ 705/50; 705/51; 705/54; 705/57; 705/59; 380/227; 380/228; 380/229; 380/230; 380/201; 380/202; 380/203; 380/204; 726/1
(58) Field of Classification Search ............. 705/51–79; 380/227–230, 201–204; 726/1
See application file for complete search history.

(56) References Cited

U.S. PATENT DOCUMENTS

| | | | |
|---|---|---|---|
| 6,212,280 B1 * | 4/2001 | Howard et al. | 380/279 |
| 6,442,690 B1 * | 8/2002 | Howard et al. | 713/175 |
| 6,587,837 B1 * | 7/2003 | Spagna et al. | 705/26 |
| 6,671,805 B1 | 12/2003 | Brown et al. | |
| 6,892,306 B1 * | 5/2005 | En-Seung et al. | 713/193 |
| 7,174,460 B2 | 2/2007 | Horita et al. | |
| 7,181,016 B2 * | 2/2007 | Cross et al. | 380/281 |
| 7,382,883 B2 * | 6/2008 | Cross et al. | 380/281 |
| 2003/0145197 A1 | 7/2003 | Lee et al. | |

FOREIGN PATENT DOCUMENTS

| | | | |
|---|---|---|---|
| JP | 2002-366030 | * | 12/2002 |
| JP | 2003-5645 | | 1/2003 |
| JP | 2005-135072 | | 5/2005 |

OTHER PUBLICATIONS

Chengqing Li: Cryptanalyses of Some Multimedia Encryption Schemes (May 2005). Retrieved from GOOGLE Jul. 18, 2010.*
Steinfeld, R., et al., "Content Extraction Signatures", Lecture Notes in Computer Science, Dec. 6, 2001, p. 285-304, vol. 2288, Springer Verlag, New York, NY, US.

* cited by examiner

*Primary Examiner*—James A Reagan
(74) *Attorney, Agent, or Firm*—McDermott Will & Emery LLP

(57) ABSTRACT

Disclosure of information is controlled selectively depending on users such that a plurality of users having different roles bearing no inclusive relation with one another can access the same area. Content is divided into a plurality of areas. For each of the areas obtained by division, secret keys (encryption/decryption keys in symmetric-key cryptography) are generated. The generated keys are encrypted using public keys in public-key cryptography, which are set in advance for the users depending on their respective roles. In the case where the content is to be disclosed to a plurality of users having different roles, the encryption of secret keys is performed separately for each user. These encrypted contents and encrypted secret keys are used to generate encrypted text.

14 Claims, 16 Drawing Sheets

| | ENCRYPTION KEY | DECRYPTION KEY |
|---|---|---|
| KEY OF USER U1: KU1 | PU1 | SU1 |
| KEY OF USER U2: KU2 | PU2 | SU2 |
| ⋮ | ⋮ | ⋮ |
| KEY OF USER U5: KU5 | PU5 | SU5 |
| ⋮ | ⋮ | ⋮ |
| SHARED KEY OF SECTION K1: KK1 | PK1 | SK1 |
| SHARED KEY OF SECTION K2: KK2 | PK2 | SK2 |
| ⋮ | ⋮ | ⋮ |
| SHARED KEY OF DEPARTMENT B1: KB1 | PB1 | SB1 |
| ⋮ | ⋮ | ⋮ |

FIG. 10

```
<MRCipher> ──1000
    <MRCipherParam/> ──1001
        <EncryptionAlgorithm Algorithm=""/> ──1002
    </MRCipherParam>
    <MRBlocks> ──1003
        <MRBlock> ──1004
            <EncryptedKeyList> ──1005
                <EncryptedKey Key_id=""> ──1006
                    <KeyEncryptionAlgorithm Algorithm=""/> ──1007
                    <EncryptedSEKValue>abEd...</EncryptedSEKValue> ──1008
                </EncryptedKey>
                    :
            </EncryptedKeyList>
            <TargetList> ──1009
                <Target URI=""> ...... </Target> ──1010
                    :
            </TargetList>
            <CiphertextData>abedcd....</CiphertextData> ──1011
                :
        </MRBlock>
            :
    </MRBlocks>
</MRCipher>
```

501 HEADER

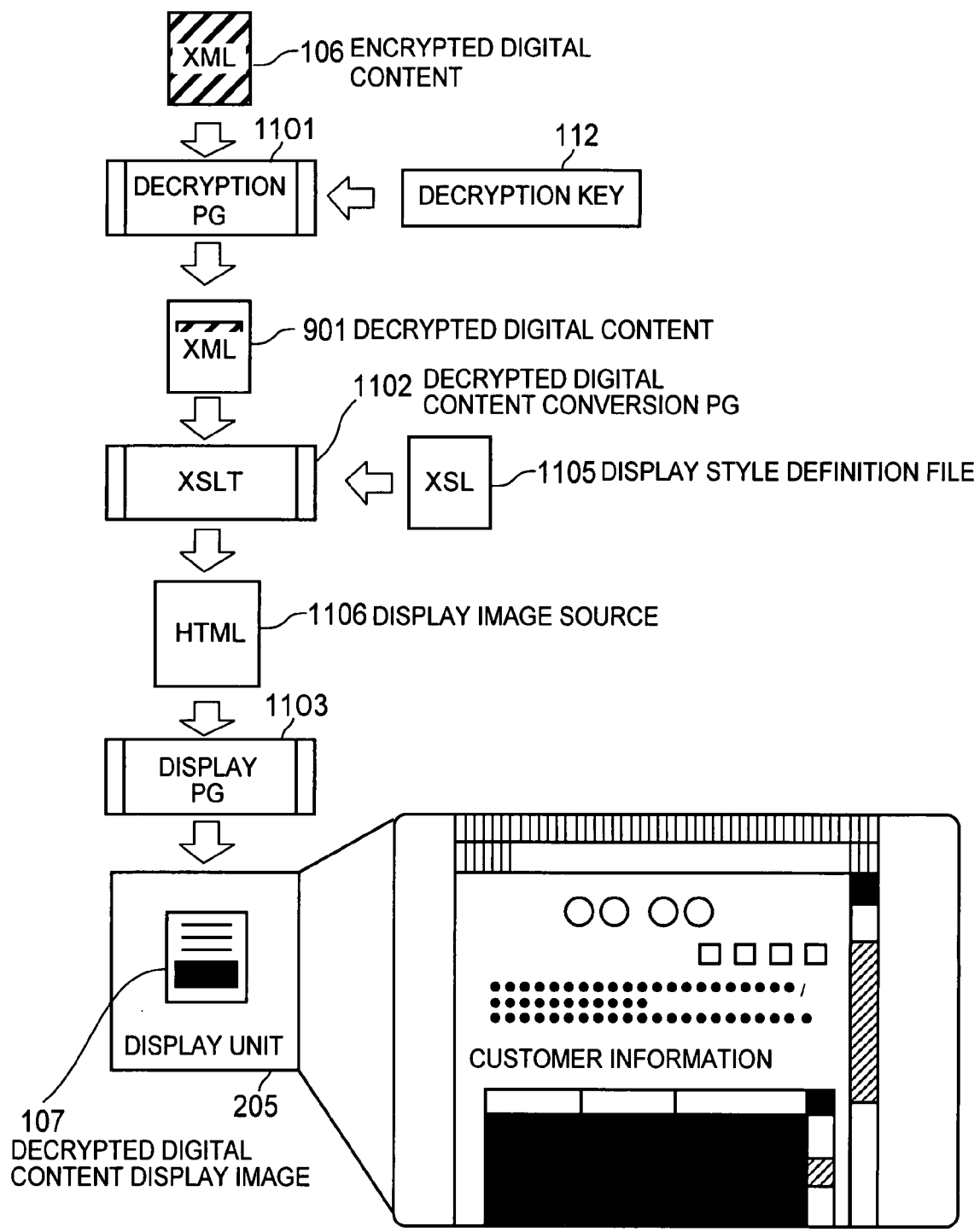

FIG. 14

| ITEM | VALUE | AREA |
|---|---|---|
| ID | 123456 | A |
| APPLICANT'S NAME | TANAKA, ICHIRO | A |
| ADDRESS | KAWASAKI CITY ... | A |
| DATE OF BIRTH | 1979/11/11 | A |
| BANK ACCOUNT NUMBER | 123-12345 | B |
| ANNUAL INCOME | 10 MILLION YEN | C |
| SECRET CODE NUMBER | 8840 | D |

FIG. 15

| ID | 123456 |
|---|---|
| APPLICANT'S NAME | TANAKA, ICHIRO |
| ADDRESS | KAWASAKI CITY ... |
| DATE OF BIRTH | 19**/11/11 |
| BANK ACCOUNT NUMBER | 123-**** |
| ANNUAL INCOME | ■ |
| SECRET CODE NUMBER | ■ |

DIGITAL CONTENT ENCRYPTION AND DECRYPTION METHOD AND WORKFLOW SYSTEM USING DIGITAL CONTENT

INCORPORATION BY REFERENCE

This application claims priority based on Japanese patent applications, No. 2006-041813 filed on Feb. 20, 2006 and No. 2006-353690 filed on Dec. 28, 2006, the entire contents of which are incorporated herein by reference.

BACKGROUND

The present invention relates to a method of encrypting and decrypting digital contents. According to the technique of the present invention, it is possible to disclose digital contents selectively to users, depending on roles of the users.

Recently, as information and communication devices develop, business processing, which has been conventionally performed on paper, is becoming computerized. Along with this, procedures (workflow) for application and approval, which are conventionally carried out on paper, are being executed electronically through a network (For example, see paragraphs 0013-0024 of Japanese Unexamined Patent Laid-Open No. 2005-135072 (hereinafter, referred to as Document 1)). Such digital content exchanged through a network usually include information (for example, private information) whose disclosure should be restricted depending on users browsing the content. Once such information leaks, immeasurable damage such as compensation for the loss or loss of credibility is caused.

Here, "content" means a record such as text, sound, picture and the like contained in a petition, an application or minutes of a meeting, or information arbitrarily combining two or more of them. When in particular these items are expressed in digital data, they are called "digital content". However, in the following description, digital content is a simply referred to as content.

Conventionally, when content should be disclosed selectively to users depending on roles of the users, the content is managed in a centralized way by a database and access to the database is controlled such that information is not disclosed to an unauthorized user (See, the paragraphs 0013-0024 of Document 1).

On the other hand, with respect to content exchanged through a network, methods of encrypting information for safeguarding are known.

Such methods include a method in which encryption keys are generated hierarchically and used for partial encryption of content so that a content area available to a recipient having a low authorization is restricted (for example, see paragraphs 0013-0035 of Japanese Unexamined Patent Laid-Open No. 2002-366030, which is hereinafter referred to as Document 3), and a method in which a key of a specific user is used for partial encryption of private information in an electronic medical chart so that an unauthorized user cannot browse the private information (for example, see paragraphs 0009-0011 of Japanese Unexamined Patent Laid-Open No. 2003-5645, which is hereinafter referred to as Document 2).

SUMMARY OF THE INVENTION

In a centralized content management method using a database, as disclosed in Document 1, it is necessary that a user can always access one and the same database server. However, in a situation where one cannot access the same database server, as is the case when he wishes to process a document through an outside customer, it is impossible to obtain information itself. Further, in the case of centralized management using a database, there arises a problem in that, once content is outside the database management, it is difficult to control disclosure of information selectively depending on users.

Further, generally an administrator of a database can browse all information managed by the database.

On the other hand, the method of Document 2 does not consider the case where a plurality of users in different roles access the same area. Further, according to the method of Document 3, a plurality of users in different roles can browse the same area, only on the condition that the roles of the users have inclusive relations with one another.

Thus, it is difficult to flexibly control disclosure and non-disclosure of information according to roles of various users.

The present invention makes it possible for a plurality of users in different roles to browse the same area, and provides a more flexible encryption method adapted for various structures of users' roles. As a result, it is possible to disclose information selectively depending on users who wish to browse, based on content information.

Further, using the above-mentioned encryption technique, the present invention provides a technique that can construct a workflow system without requiring centralized management using a database.

Further, according to the present invention, an author of content can determine for himself who can browse which part of the content, and, it is possible to store and distribute content while keeping information secret even from the database administrator.

In detail, content is divided into a plurality of areas (also, referred to as partial contents) depending on roles. Secret keys (i.e. encryption/decryption keys in the symmetric-key cryptography) are generated respectively for the areas resulting from the division. The generated secret keys are used for encrypting the content with respect to the divided areas, respectively. Further, the generated secret keys are encrypted with public keys of the public-key cryptography, which have been set previously depending on the various roles. Here, in the case where the content is to be disclosed to a plurality of users or groups of users having different roles, each of the secret keys is encrypted separately. Further, according to the present invention, information can be selectively disclosed depending on users also with respect to content that is outside database management.

By storing encrypted content in a database, content access control can be managed with keys delivered in advance to a user. As a result, access control for a database server can be simplified, and load relating to this can be reduced.

In detail, the present invention provides a digital content encryption method, wherein: an encryption apparatus divides digital content into a plurality of areas, and assigns respective session keys different from one another to the areas generated by the division; the session keys assigned to the areas are used for encrypting the respective areas concerned; a pair of a public key and a private key of public-key cryptography is assigned to each set of at least one user who uses the digital content after encryption, each pair of a public key and a private key being different from another pair assigned to another set; for each of the areas, the session key assigned to that area is encrypted with the public key assigned to the set of at least one user who is permitted to browse the area in question; an encrypted digital content comprising the plurality of encrypted areas and the encrypted session keys is outputted, with each of the areas having at least one of the session keys generated for that area.

Further, header information of the encrypted digital content may include, as partitioning information, information indicating dividing positions of the digital content and information indicating which user can decrypt which encrypted area in the encrypted digital content.

Further, expressing an inclusive relationship between users and the at least one set by associating the users respectively with leaves of a tree and by associating the at least one set to which the users belong respectively with nodes and a root of the tree, a key management apparatus may assign a public key and a private key corresponding to the public key to each of the leaves, the nodes, and the root, with each pair of a public key and a private key being different from another pair. Different private keys assigned respectively to a leaf corresponding to one of the users, the root, and nodes existing on a path connecting the leaf and the root are delivered as decryption keys to the user corresponding to the leaf. The public keys corresponding to the private keys delivered to the user are made public as encryption keys corresponding to the decryption keys.

Further, in detail, the present invention provides a digital content decryption method for digital content that has been encrypted according to the above method, wherein: a decryption apparatus uses a private key provided from one of the users to decrypt the session key that has been encrypted with the public key corresponding to the private key, and uses the decrypted session key to decrypt the area that has been encrypted with the session key; and displays the decrypted area, and blacks out and displays the areas that are not decrypted by the decryption apparatus.

Further, the encryption apparatus may constructs, for each of the users, a session key set including session keys used for encrypting respective areas that can be browsed by the user in question. The encryption apparatus encrypts the respective session key sets for the users, using the respective public keys of the public-key cryptography assigned to the users.

Further, the encryption apparatus may generate an order control random value for a first user. The encryption apparatus encrypts a first session key set constructed for the first user and the order control random value generated for the first user, using the public key of the public-key cryptography assigned to the first user. And, a result of the encryption is taken as an order control random value for a second user, and the order control random value is used for encrypting a second session key set for the second user, the second session key set being different from the first session key set.

Further, in detail, the present invention provides a decryption method corresponding to the encryption method, wherein: a decryption apparatus: decrypts the order control random value of the second user, using a private key provided from the second user to the decryption apparatus; divides a result of the decryption into the order control random value of the first user and the second session key set; decrypts areas that have been encrypted with session keys obtained from the second session key set; and generates the encrypted digital content from the order control random value of the first user and the encrypted areas.

Further, in the above method, a plurality of second order control random values may be generated by applying threshold secret sharing processing to the order control random value. With respect to each of the second order control random values, the session keys are encrypted. A set of results of the encryption of the session keys is taken as the order control random value for the second user.

According to the present invention, in exchanging content through a plurality of users, it is possible to disclose information selectively depending on users who browse the content, without employing centralized management using a database.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 10 shows a method of realizing encrypted content in the first embodiment;

FIG. 11 illustrates a method of displaying encrypted content in the first embodiment;

FIG. 14 illustrates a display image of an application used in the second embodiment;

FIG. 15 illustrates a display image of browsed decrypted content in the second embodiment;

DETAILED DESCRIPTION OF THE EMBODIMENTS

Embodiments of the present invention will now be described.

First Embodiment

Figure 1:
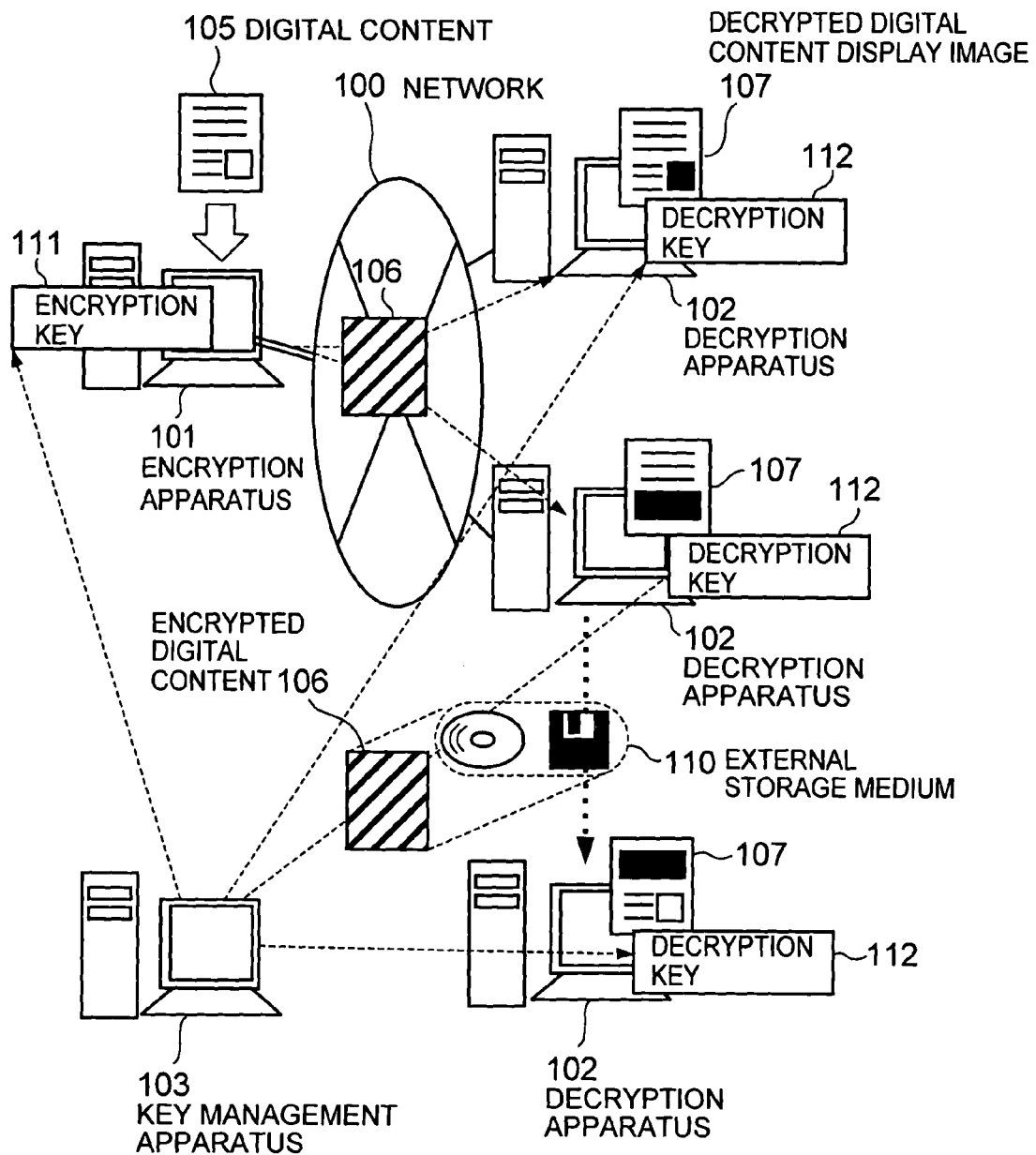
FIG. 1 illustrates an outline of a network configuration according to a first embodiment of the present invention.

FIG. 1 is a schematic diagram showing distribution of content in a first embodiment. As shown in the figure, in the present system, content is sent and received between an encryption apparatus 101 and decryption apparatuses 102 through a network 100. The encryption apparatus 101 encrypts the content 105, and the decryption apparatuses 102 each decrypt the encrypted content 106. As shown in the figure, the encrypted content 106 received by a decryption apparatus 102 may be sent and received off-line through an external storage medium 110, not through the network 100. Further, the network 100 is not limited to an external network such as the Internet, and may be an internal network such as a LAN. FIG. 1 shows the case where content is distributed through an external storage medium 110 between decryption apparatuses 102. The content, however, may be distributed using an external storage medium 110 directly from the encryption apparatus 101 to a decryption apparatus 102.

A key management apparatus 103 associates a role, an encryption key 111 and a decryption key 112 with each other, and further distributes decryption keys 112 depending on roles of users, and opens an encryption key 111 corresponding to each role to the public. A public key and a private key corresponding to that public key in the public-key cryptography may be preferably used as an encryption key 111 and a decryption key 112 respectively. The reason is that when the key management apparatus 103 makes public, as an encryption key 111, a public key in the public-key cryptography, then any user can obtain the encryption key 111 easily from the key management apparatus 103 and thus any user can encrypt content.

To disclose the encryption key 111, for example, the key management apparatus 103 may use a web server or the like to disclose information such as each user or group and a corresponding encryption key 103, so that the encryption apparatus 101 can access the web server of the key management apparatus 103 to obtain the required encryption key 111.

In FIG. 1, the encryption key 111 and the decryption key 112 are directly distributed to the encryption apparatus 101 and decryption apparatuses 102. However, a different arrangement may be employed. For example, an external storage medium 110 may be used to distribute the decryption key 112 to each user. In that case, the decryption key 112 is important data used for each user to exercise his role, and the decryption key 112 may preferably be stored in a tamper-resistant device such as an IC card.

Here, the word "role" means an attribute, such as a position or a group such as a department to which one belongs in a company, that is set for a user and used for indicating content area that can be browsed by the user when he accesses the content.

A plurality of decryption keys 112 may be distributed to a user. For example, assuming that a user U belongs to a section B of a department A, the key management apparatus 103 can assign keys as follows.

The key management apparatus 103 generates a pair of an encryption key 111 (PA) and a decryption key 112 (SA) shared by users belonging to the department A, a pair of an encryption key 111 (PB) and a decryption key 112 (SB) shared by users belonging to the section B, and a pair of an encryption key 111 (PU) and a decryption key 112 (SU) for the user U. Further, the key management apparatus 103 opens the encryption key 111 (PA) shared by the department A, the encryption key 111 (PB) shared by the section B, and the encryption key 111 (PU) of the user U to the public so that the encryption apparatus 101 can obtain these encryption keys 111. Further, the key management apparatus 103 delivers the shared decryption keys 112 (SA and SB) of the department A and the section B and the decryption key 112 (SU) specific to the user U to the user U.

Thus, the user U holds three keys, the decryption key 112 (SA) shared by the department A, the decryption key 112 (SB) shared by the section B, and the decryption key 112 (SU) specific to the user U.

In opening the encryption keys 111 to the public, it is preferable that issuance of the encryption keys 111 by the key management apparatus 103 can be validated. For example, the key management apparatus 103 may issue a certificate for each encryption key 111.

Figure 2:
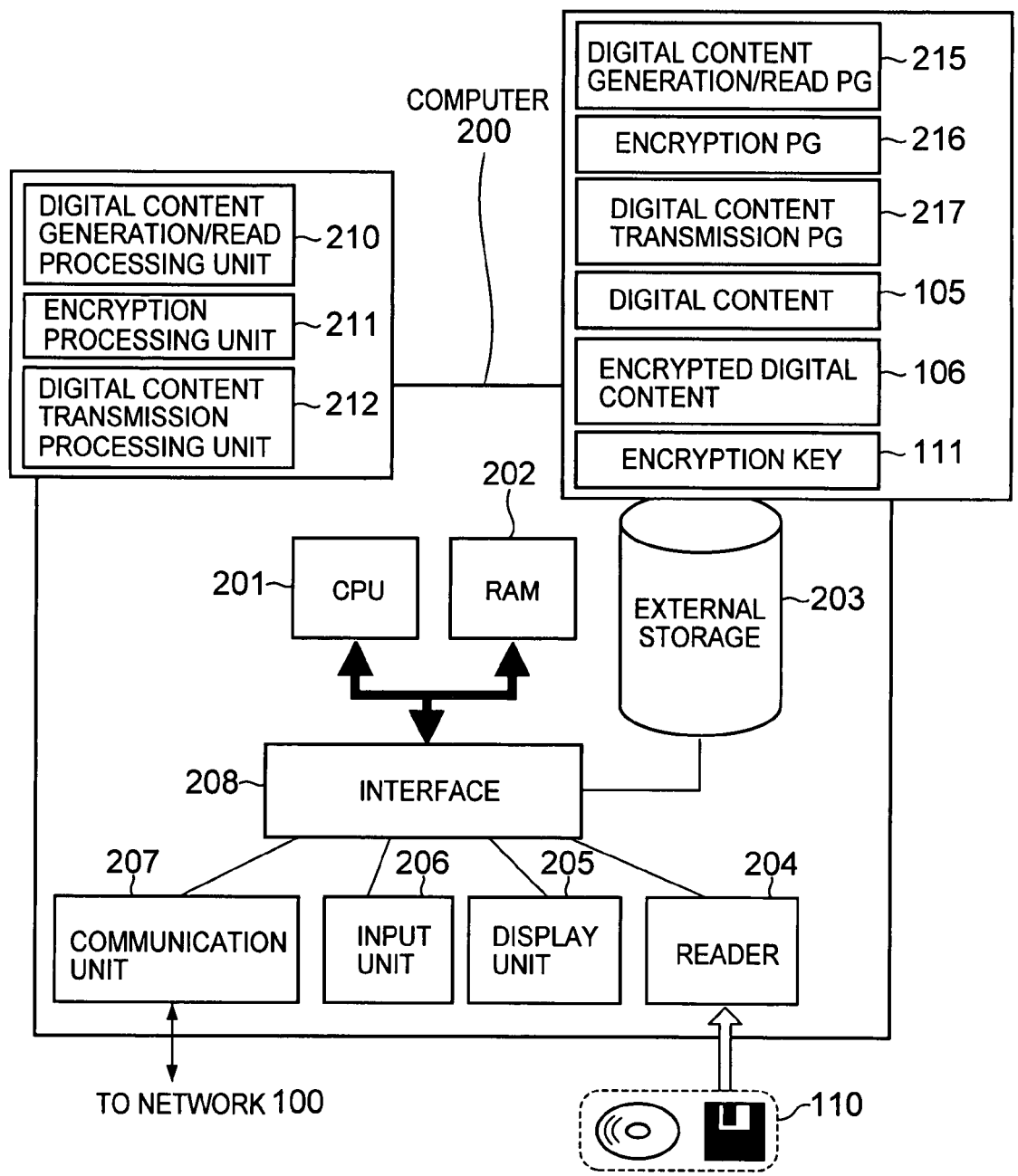
FIG. 2 illustrates an outline of an encryption apparatus in the first embodiment.

FIG. 2 is a schematic diagram showing a configuration of the encryption apparatus 101. The encryption apparatus 101 is a computer 200 with an ordinary configuration, comprising: a CPU 201; a RAM 202 functioning as a work area for the CPU 201; an external storage 203 such as an HD; a reader 204 that takes in data from an external storage medium 110 such as an FD, a CD-ROM or the like; an output unit 205 such as a display; an input unit 206 such as a mouse, a keyboard or the like; a communication unit 207 for communicating with another apparatus through the network 100; and an interface 208 that controls data communication between the above-mentioned components.

The external storage 203 of the encryption apparatus 101 stores a content generation/read program (hereinafter, "program" is abbreviated to PG) 215, an encryption PG 216, and a content transmission PG 217. These programs are executed by the CPU 201 to realize respective processing units, i.e. a content generation/read processing unit 210, an encryption processing unit 211, and a content transmission processing unit 212, on the encryption apparatus 101.

Each decryption apparatus 102 has a similar configuration to that of the encryption apparatus 101. However, the external storage 203 of the decryption apparatus 102 stores the encrypted content 106, a decryption key 112, and a decryption PG, a decrypted content display PG, the content transmission PG 217 and a content reception PG, which respectively realize a decryption processing unit, a decrypted content display processing unit, a content transmission processing unit and a content reception processing unit.

Also the key management apparatus 103 has a similar configuration to that of the encryption apparatus 101. However, in the key management apparatus 103, the external storage 203 stores a key management PG, an encryption and decryption key generation PG, an encryption key distribution PG and a decryption key distribution PG, which respectively realize a key management processing unit, an encryption and decryption key generation processing unit, an encryption key distribution processing unit, and a decryption key distribution processing unit, and the encryption key 111 and the decryption key 112. In the key management apparatus 103, it is not necessary that both the encryption key 111 and decryption key 112 are stored in the external storage 203. For example, it is possible that the key management apparatus 103 manages correspondence between a decryption key 112 and a role, while an encryption key 111 is separately managed by an individual, or shared and managed by a group belonging to the role.

In the case where, as mentioned above, the key management apparatus 103 issues a certificate to an encryption key 111, the external storage 203 of the key management apparatus stores a private key for generating a certificate and a certificate generation PG for realizing a certificate generation processing unit, and the external storage 203 of each decryption apparatus 102 stores a public key to validate a certificate and a certificate validation PG for realizing a certificate validation processing unit.

Each of the above-mentioned programs may be stored in advance in the external storage 203 of the computer 200 concerned, or may be introduced to the computer 200 in question through the network 100 or a communication medium such as a carrier or a digital signal that propagates through the network 100.

It is desirable that decrypted content 107 is not stored in an external storage 203 or the like. This arrangement is employed in order that disclosure of encrypted content 106 is restricted depending on the role of a user who browses the encrypted content 106, when a decryption apparatus 102 redistributes the encrypted content 106 to another decryption apparatus 102 through the network 100 or an external storage medium 110 as shown in FIG. 1, for example.

In the following, an outline of content flow in the present embodiment will be described, and then encryption processing and decryption processing for content will be described. Further, methods of managing (i.e. methods of assigning to users) an encryption key 111 and a decryption key 112 used in the encryption processing and the decryption processing in the key management apparatus 103 will be described. Lastly, an example of the present embodiment using XML and an outline of processing from encrypted content to decrypted content display image will be described.

Figure 3:
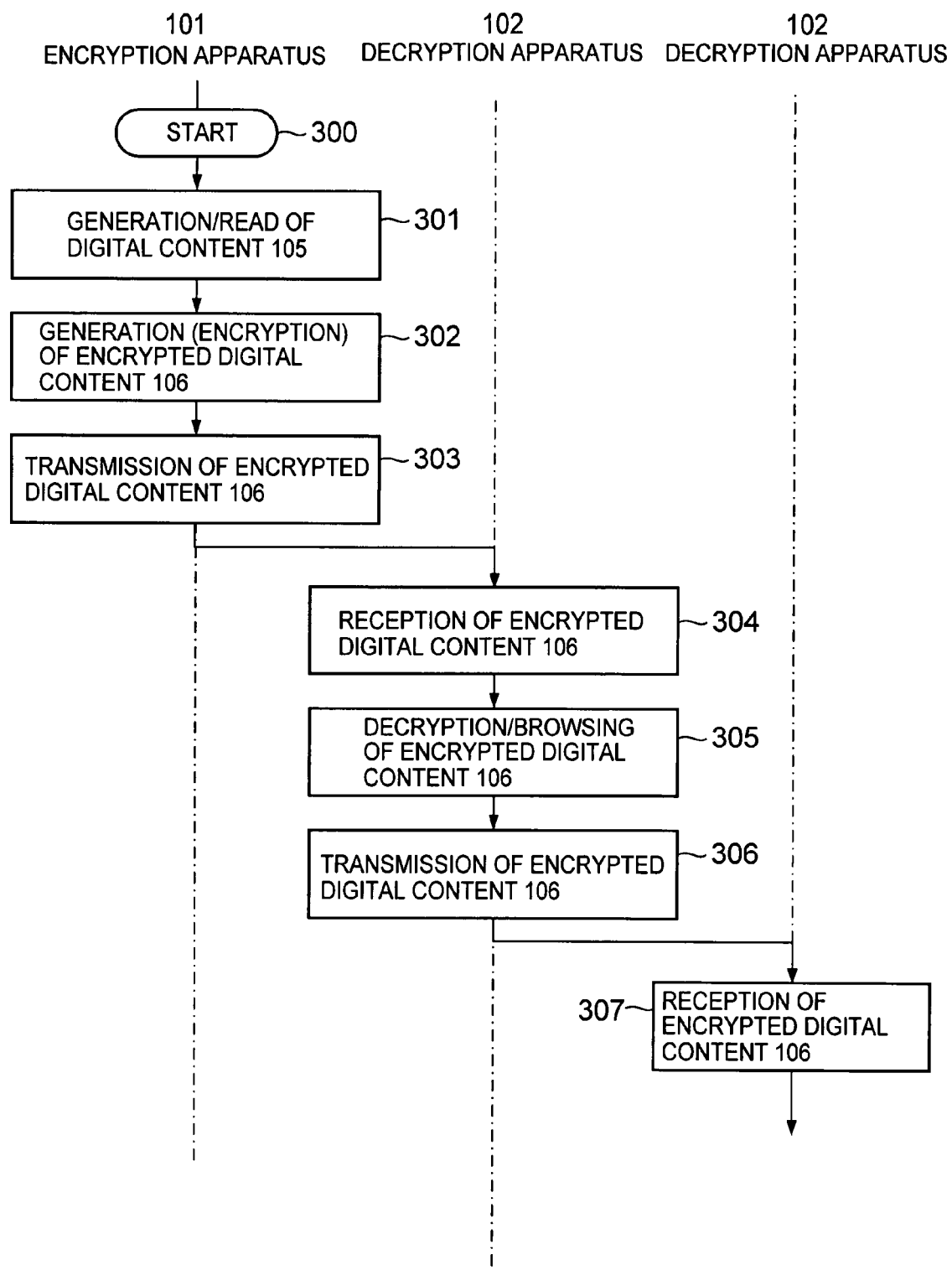
FIG. 3 illustrates an outline of a data flow in the first embodiment.

FIG. 3 shows an outline of content data flow in the present embodiment. The content data flow is as follows.

300: Start

301: Content is generated or read by using the content generation/read processing unit 210 in the encryption apparatus 101.

302: The encryption processing unit 211 in the encryption apparatus 101 encrypts the content to generate encrypted content 106.

303: The content transmission processing unit 212 in the encryption apparatus 101 transmits the encrypted content 106 to a decryption apparatus 102.

304: The content reception processing unit in the decryption apparatus 102 receives the encrypted content 106 sent from the encryption apparatus 101.

305: The content decryption processing unit and the decrypted content display processing unit in the decryption apparatus 102 perform decryption and display of the encrypted content 106.

306: The content transmission processing unit 212 in the decryption apparatus 102 transmits the encrypted content 106 to another decryption apparatus 102.

307: The content reception processing unit of the decryption apparatus 102 on the reception side receives the encrypted content 106.

In the step 306, the decryption apparatus 102 transmits the received encrypted content 106 as it is to another decryption apparatus 102. The encrypted content 106 has been encrypted by the encryption apparatus 101 such that a user unauthorized to browse it cannot decrypt each piece of information in the content (The encryption processing and the decryption processing will be described later). As a result, even when content is received from another decryption apparatus 102, it is possible to disclose information appropriately in accordance with users as set by the encryption apparatus 101.

In FIG. 3, a decryption apparatus 102 transmits the encrypted content 106 to another decryption apparatus 102 (Step 306). When, however, there is no further destination to which the encrypted content 106 should be retransmitted, the encrypted content 106 is stored or discarded. When the encrypted content is to be stored, the decryption apparatus 102 may store the encrypted content or may register the encrypted content at a database server. Further, the encrypted content 106 may be transmitted to a plurality of decryption apparatuses 102. The encryption (Step 302) of the content 105 and the decryption (Step 305) of the encrypted content 106 are respectively performed by the encryption processing unit 211 in the encryption apparatus 101 and the decryption processing unit in a decryption apparatus 102. Outlines of these pieces of processing will be described in the following.

Figure 4:
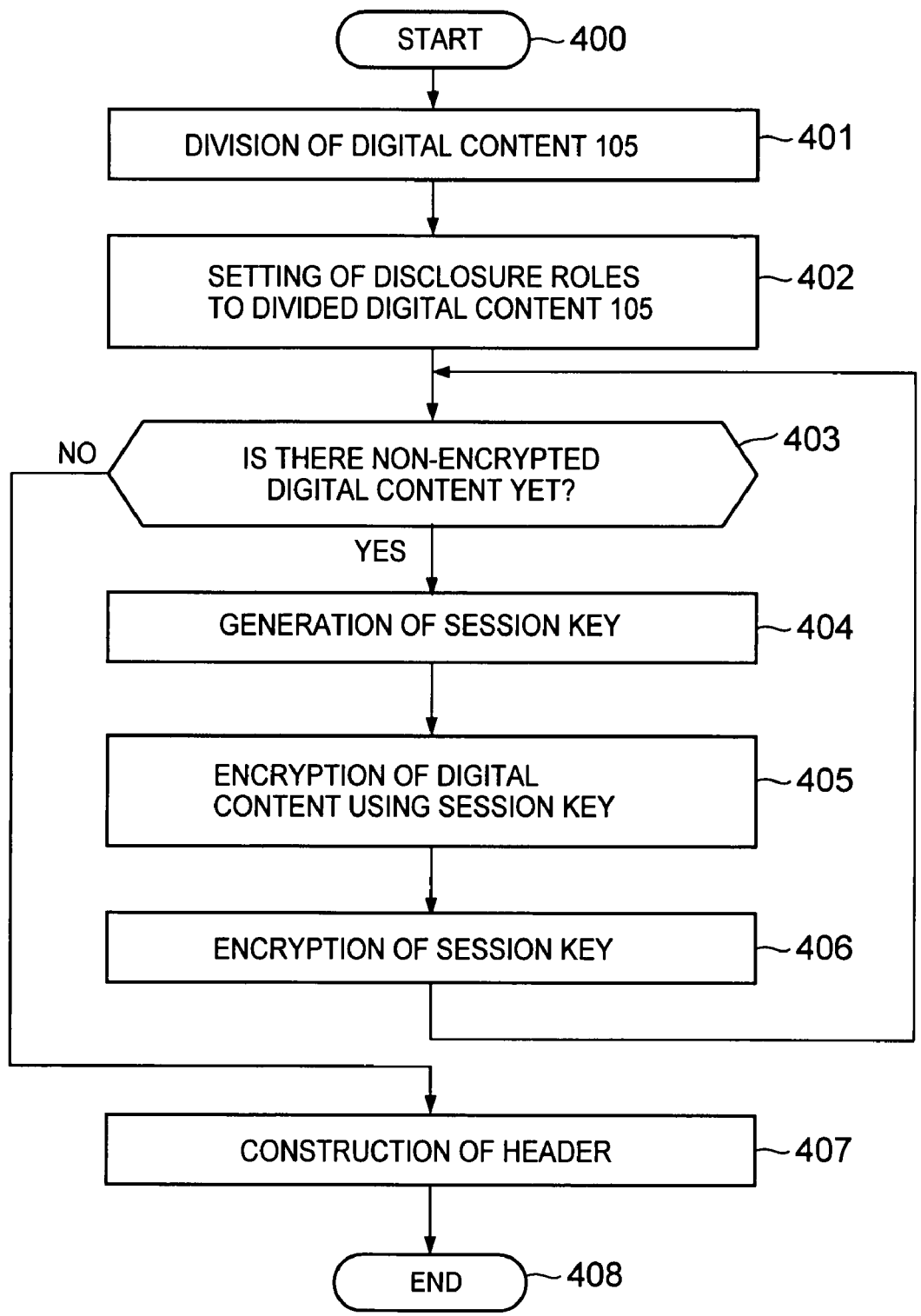
FIG. 4 illustrates an outline of encryption processing in the first embodiment.

FIG. 4 shows an outlined procedure of the encryption processing. The procedure of the encryption processing is as follows.

400: Start

401: Division of content 105

402: An encryption key is set for each partial content that resulted from the division.

403: If there is still partial content, then go to Step 404. Otherwise go to Step 407.

404: Generation of a session key.

405: The session key is used to encrypt the target partial content.

406: The session key is encrypted with the encryption key 111 set in Step 402, and then go to Step 403.

407: Construction of a header.

408: End

In Step 401, to realize selective disclosure of information, the content 105 is divided. The division of the content 105 may be performed in units of words, for example. Or, in the case where the target content 105 has a tabular form, the content 105 may be divided in units of cells or fields. Or, when the target content 105 is an XML document, the content 105 may be divided in XML elements. Further, a user may use the input unit 206 such as a mouse to designate an area and divide the content 105 by that area. In Step 407, information indicating the divided parts of the content, together with information indicating who can decrypt which area (i.e. which partial content) of the encrypted content, is described as content partitioning information in a header. In other words, the content partitioning information comprises two pieces of information, i.e. the information indicating who can decrypt which area of the encrypted content and the information indicating which area of the original content corresponds to the decrypted content. In the below-described example using XML, these pieces of the content partitioning information correspond to an MRBlock element and a TargetList element, respectively.

In Step 402 where an encryption key 111 is set for each divided content, an encryption key 111 assigned to a user or a group who can browse the area is used. At that time, a plurality of encryption keys 111 may be set for one area. In that case, the encryption processing of the session key in Step 406 is performed one by one with respect to each of the plurality of encryption keys 111 set in Step 402. Further, as far as the program is concerned in Step 402, not an encryption key 111 itself, but a reference to an encryption key 111 may be set and the actual data corresponding to the encryption key is loaded in Step 406 from the reference.

Here, the encryption keys 111 may have been previously stored in the external storage 203 in the encryption apparatus 101. For example, as described above, the key management apparatus 103 uses the web server to make public users or groups and corresponding encryption keys 111. Prior to the above-described encryption processing (Step 400 through Step 408), the encryption apparatus 101 accesses the web server of the key management apparatus 103 and obtains the encryption keys 111 from the key management apparatus 103. The method of obtaining the encryption keys 111 is not limited to the above-described one.

In the above step (Step 404), a session key is a secret key in the symmetric-key cryptography (for example, DES or the like) used for encryption and decryption of divided content. From the viewpoint of security, it is preferable to use a frequently renewed random value generated from a random number generator.

Even if the size of the target content is large, use of the symmetric-key cryptography can speed up encryption processing and reduce the data size in comparison with a method of encrypting data directly with an encryption key 111, i.e., a public key in the public-key cryptography.

In the above encryption processing, encryption of a session key is performed separately for each partial content. However, this may be changed. For example, in the case where one user is permitted to browse two or more partial contents, session keys that are different from one another and used for encrypting those partial contents respectively may be concatenated into one for each user, and this concatenated key is encrypted with an encryption key (i.e. a public key) 111 of the user in question. This can reduce the number of times session keys are encrypted in the encryption processing, and reduce the data size of the encrypted content 106.

In that case, after concatenating a plurality of session keys, encryption processing using an encryption key 111 is performed. To concatenate the session keys, it may be determined in advance in the system as a whole to use a session key of bits of a specific fixed length, for example 128 bits. Session keys may be simply concatenated, or a specific format such as ASN.1 may be employed to clearly indicate boundaries between session keys.

Further, in order to know which partial content should be decrypted by a session key extracted at the time of decryption, it is sufficient to determine in advance, for the system as a whole, that each partial content be given an ID and that an ID number of the corresponding partial content be given before the session key, or simply that extracted session keys be used in order from the top.

Figure 5:
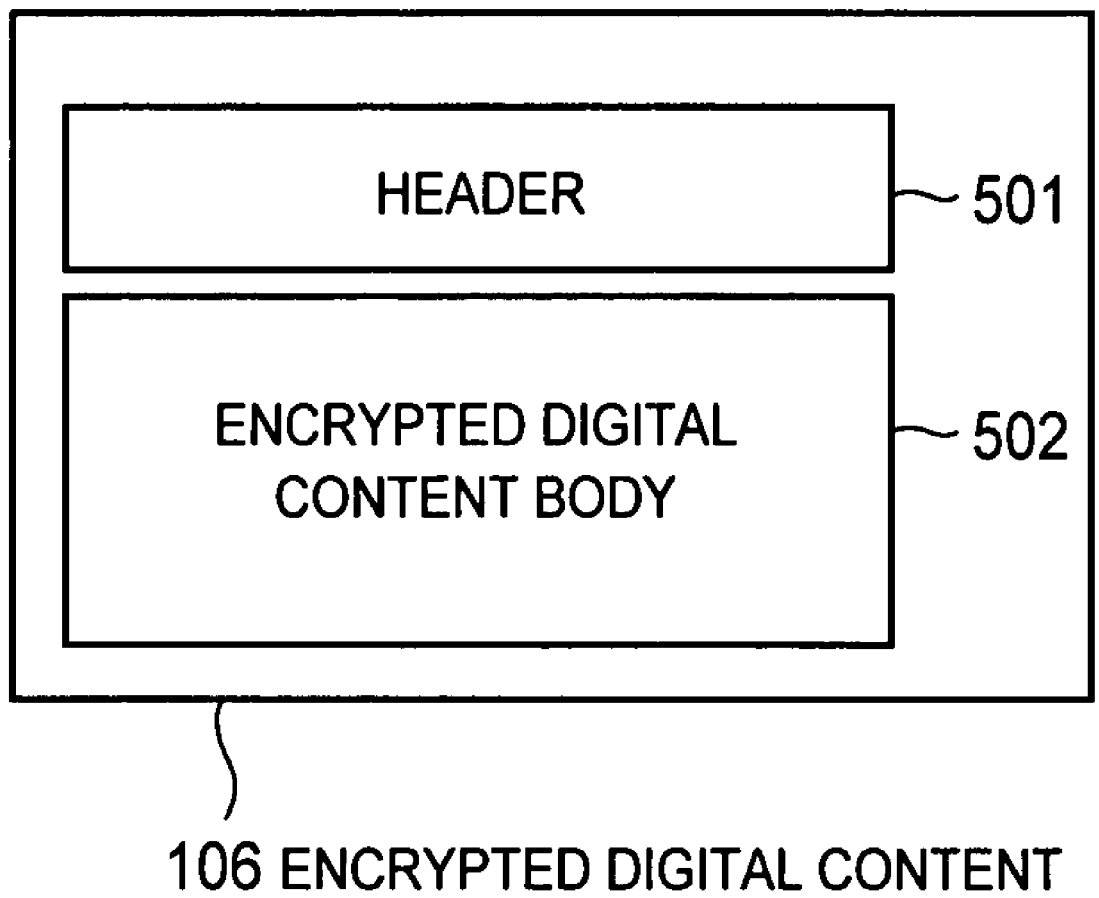
FIG. 5 illustrates an outline of structure of an encrypted content in the first embodiment.

FIG. 5 schematically shows an example of a structure of encrypted content 106 generated by the above-described processing. The encrypted content 106 comprises two sections, i.e., a header 501 and an encrypted content body 502. The encrypted content body 502 is obtained by encrypting the content 105. The header 501 stores the encrypted session key and the content partitioning information that indicates which area of the encrypted content body 502 can be decrypted (browsed) by a user of which role. Details of a method of constructing a header 501 will be described later (see FIG. 10).

Structure of the encrypted content 106 is not limited to the structure shown in FIG. 5. For example, in the case where a header 501 is constructed using XML shown in FIG. 10, the header 501 includes encrypted session keys and content partitioning information of divided content of the encrypted content body 502 as well as the encrypted content itself, while the encrypted content body 502 includes not the encrypted content itself but the format of the original document.

Figure 6:
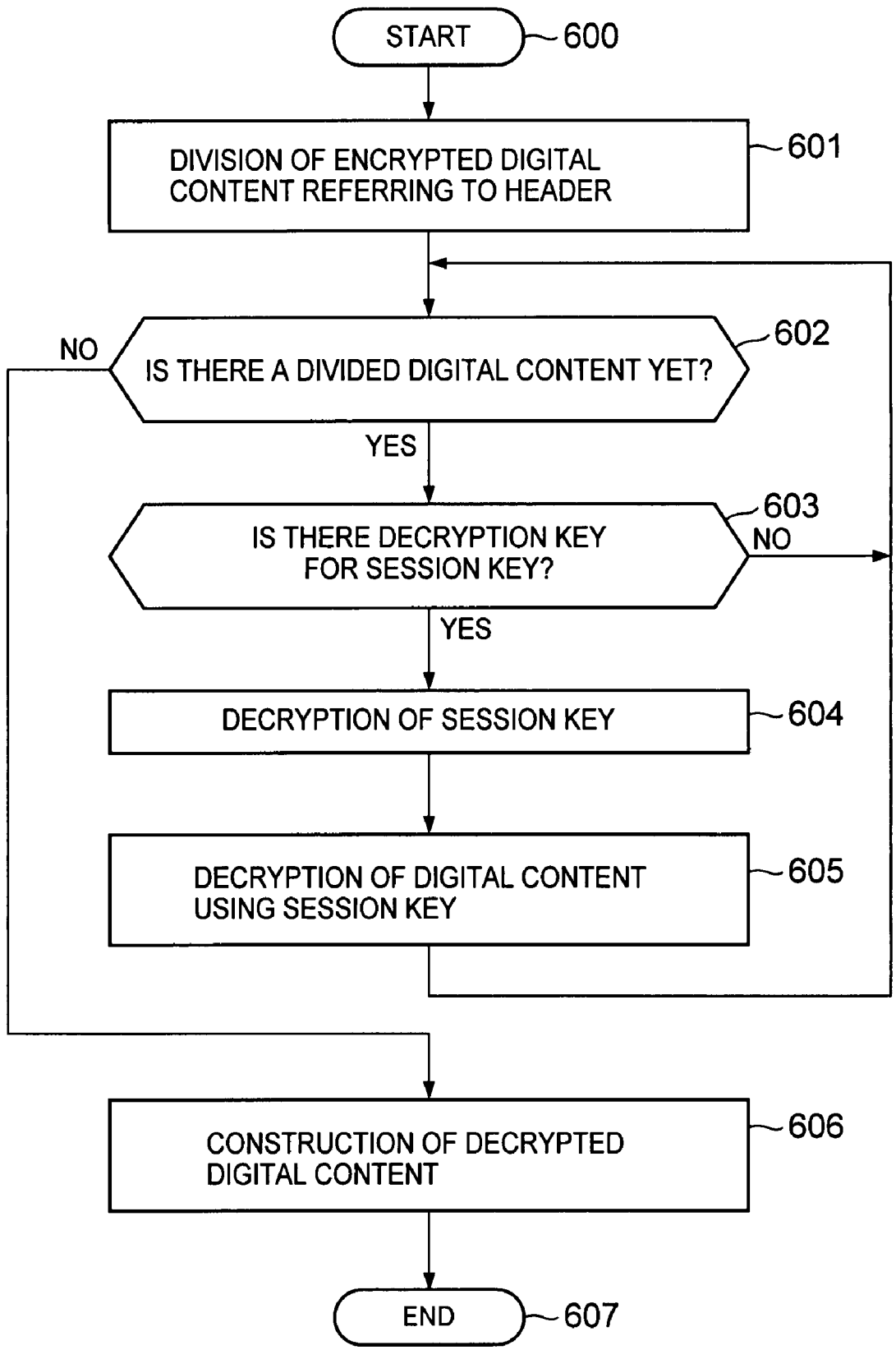
FIG. 6 illustrates an outline of decryption processing in the first embodiment.

FIG. 6 shows an outline of the procedure for the decryption processing, which is performed when the decryption PG is executed. The decryption procedure is as follows.

600: Start
601: Division of the encrypted content body 502
602: If there is still partial content which has not yet been decrypted, then go to Step 603. Otherwise go to Step 606.
603: If the encrypted session key corresponding to the partial content in question can be decrypted based on decryption key information given from user, then go to Step 604. Otherwise go to Step 602
604: The encrypted session key is decrypted with the decryption key 112.
605: The decrypted partial content is decrypted with the decrypted session key, and go to Step 602.
606: Construction of the original content (referred to as the decrypted content) from one or more partial content decrypted in Step 605.
607: End Division of the encrypted content body 502 in Step 601 is performed as follows, for example. At the time of generating the header 501 in the decryption processing (Step 407), it is clearly described in the content partitioning information 803 which area (i.e. which partial content) of the encrypted content body 502 can be browsed by which user (For example, it is described that the user U can browse from n-th byte to m-th byte of the encrypted content body 502). In Step 601, by referring to this information, the encrypted session key and the encrypted partial content are extracted from the encrypted content body 502. Further, based on the information described in the content partitioning information, the decrypted content is constructed from the decrypted partial content(s) (Step 606).

When a decryption apparatus 102 modifies a part of the decrypted content, a session key is generated again for the modified partial content. The partial content and the session key are then encrypted, to update the encrypted digital content 106.

In the below-described construction of the header 501 by using XML, the partial contents are managed in elements. By referring to those elements (MRBlock elements), the above-mentioned encrypted session key, the encrypted partial content and the like can be extracted. Further, the decrypted content is constructed by referring to a Target element in a TargetList element, and by describing the destructed contents in the element described in the Target element (This will be described in detail later).

Further, in the above processing, it is preferable that the decryption key 112 can be referred to from the encrypted content 502, or the decryption key 112 held by the user may be explicitly delivered to the decryption PG prior to execution of the program. In that case, as far as the program is concerned, not the decryption key itself but a reference to the decryption key may be delivered.

The procedure of the decryption processing need not be performed as described in Step 600 through Step 607. For example, the construction of the decrypted content in Step 606 may be performed each time after the decryption processing is performed for one partial content in Step 605.

Next, a key management method (i.e. a method of assigning encryption keys 111 and decryption keys 112 to users) in the key management apparatus 103 will be described.

Figure 7:
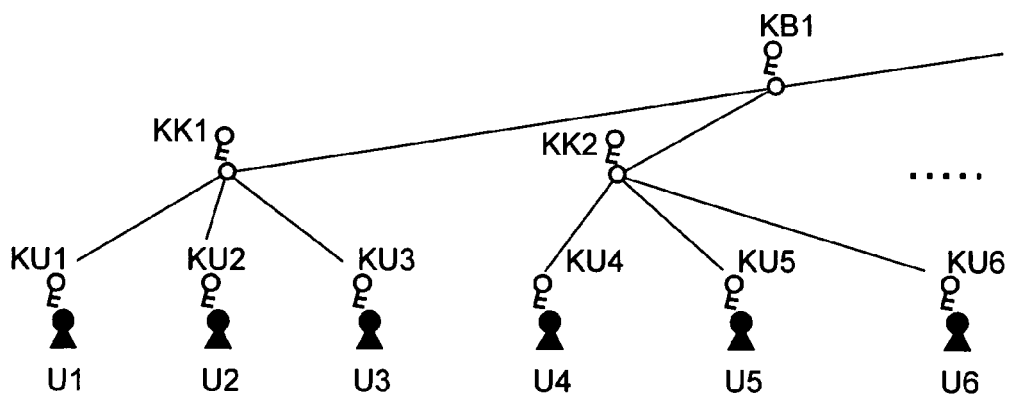
FIG. 7 illustrates a key management method in the first embodiment.

FIG. 7 shows an example of the key management method in the key management apparatus 103. In this key management method, class structure of groups, for example, in a company is noted, and users and groups are expressed respectively as leaves and nodes or a root (leaves, nodes and a root are generically called nodes) of a tree. Each node is assigned a pair of an encryption key 111 and a decryption key 112, which are different from keys 111 and 112 assigned to another node. To each user, are delivered all the decryption keys 112 that belong to the path leading from the leaf assigned to him, to the root of the tree.

For example, in the example shown in FIG. 7, a user U1 belongs to a department B1 and a section K1. Thus, the user U1 is assigned keys on the path leading from the node assigned to him to the root node, i.e. personal keys KU1=(PU1, SU1) of the user U1, shared keys KK1=(PK1, SK1) of the section, shared keys KB1=(PB1, SB1) of the department, and so on. Here, SU1, SK1 and SB1 are decryption keys 112, and PU1, PK1 and PB1 are encryption keys 111 corresponding to those decryption keys 112. Accordingly, the key management apparatus 103 delivers the decryption keys SU1, SK1, SB1, . . . (i.e. the keys assigned to the path leading from the node assigned to the user U1 to the root node) to the user U1.

In the case where the same user has a plurality of positions, the user at different positions may be considered as different users and expressed by different nodes of a tree, for example. Decryption keys 112 assigned to paths leading from those nodes to the root node are delivered to that user. At that time, if some decryption keys 112 to be delivered to the user are duplicate, (as in the case where two paths overlap, for example), it is sufficient to deliver only one of the duplicate decryption keys 112. Also with respect to nodes (i.e. leaves) corresponding to the user himself, it is sufficient that an encryption key 111 and a decryption key 112 are assigned to one of those nodes, and delivered and opened to the public.

According to the above-described key management method, it becomes possible to exchange encrypted content 105 efficiently between users as described in the following.

The encryption processing unit 211 described in the present embodiment encrypts a session key generated for each partial content, using an encryption key 111 of a user who can browse the area in question, and stores the encrypted session key in the header 501 (Step 406). Accordingly, in the case where a plurality of users browse the same area, a session key is encrypted by a plurality of encryption keys 111 so that the data size of the header 501 increases. By using encryption keys PK1 and PB1 shared by a department and a section instead of encryption keys 111 specific to respective users, it is possible to concentrate encryption of a session key with respect to information shared by the department or the section, and the data size of the header 501 of the encrypted content 106 can be reduced (See examples of encryption and decryption of FIGS. 8 and 9).

The key management apparatus 103 opens the encryption keys assigned to the users and the groups to the public. As described above, it is preferable that the decryption keys assigned to the users are stored in tamper-resistant devices such as IC cards, and those IC cards are delivered to the respective users directly.

In the present key management method, when a user is added, deleted or moved, it is preferable that new keys are generated and shared keys are updated such that an added user cannot illegally browse previously-encrypted content and a deleted user cannot illegally browse content encrypted thereafter.

This is realized as follows.

First, when a user is deleted, all pairs of an encryption key 111 and a decryption key 112 of nodes (including the leaf and the root) existing on the path leading from the leaf corresponding to the deleted user to the root are updated. After the update, the key management apparatus 103 distributes the updated decryption keys 112 to the user expressed by the node or users belonging to the groups expressed by the nodes, and makes public the encryption keys 111.

Similarly, when a user is added, the user is added as a leaf on the tree, and all pairs of an encryption key 111 and a decryption key 112 of nodes (including the leaf and the root) existing on the path leading from the leaf to the root are updated. After the update, the key management apparatus 103 distributes the updated decryption keys to the users belonging to the groups expressed by the nodes, and makes public the encryption keys 111.

For example, in FIG. 7, when the user U1 is deleted, the keys KK1 and KB1 shared by the section and department concerned are updated. The updated decryption keys SK1 and SB1 are distributed to the users U2 and U3, and the updated decryption key SB1 is delivered to the users U4, U5 and U6. The decryption keys PK1 and PB1 are made public.

In FIG. 7, in the case where the user U1 is a newly added user, keys KU1 of the user U1 are generated anew, and the keys KK1 and KB1 shared by the section K1 and the department B1 are updated. After the update, the decryption keys SU1, SK1 and SB1 are delivered to the user U1. Further, the decryption keys SK1 and SB1 are delivered to the users U2 and U3, and the decryption key SB1 is delivered to the users U4, U5 and U6. The corresponding encryption keys PU1, PK1 and PB1 are made public.

In the above key update processing, if a decryption key 112 is stored in an external storage medium 110 such as an IC card, then recovery and redelivery of the external storage medium 110 for delivering the updated decryption key 112 causes increase of time and cost. In such a case, an updated decryption key 112 may be delivered through the network 100. In the case where a decryption key 112 is delivered through the network 100, the updated decryption key 112 can be delivered safely by the following procedure.

In the case where a user is deleted, the encryption key 111 which is assigned to the child nodes of an updated decryption key 112 without the child node assigned another updated encryption key is used to encrypt updated decryption keys 112 which are assigned to nodes on path leading from the node of the updated decryption key concerned to the root. Then, the updated-and-encrypted decryption keys 112 are each delivered to users having the decryption key 112 corresponding to the encryption key 111 used for the encryption concerned. Further, in the case where a user is added, updated decryption keys 112 are encrypted with the respective encryption keys 111 before the update. Then, the updated-and-encrypted decryption keys are each delivered to users having the decryption key 112 (i.e. the decryption key 112 before the update) corresponding to the encryption key concerned.

In the case where a plurality of updated decryption keys 112 are delivered to one and the same user in the above processing, it is possible that the encryption key 111 assigned to the node at the lowest level among the encryption keys 111 held by the user is used to encrypt those updated decryption keys 112 together before delivering those updated decryption keys 112.

In detail, if the user U1 is deleted in the above example, then, with respect to the users U2 and U3, the decryption keys SK1 and SB1 of the section K1 and the department B1 are encrypted with the encryption key PU2 of the user U2 and sent to the user U2, and similarly the decryption keys SK1 and SB1 encrypted with the encryption key PU3 of the user U3 are sent to the user U3. With respect to the users U4, U5 and U6, the shared decryption key SB1 of the department B1 is encrypted using the encryption key PK2 of the section K2 and delivered to the users U4, U5 and U6.

Further, if the user U1 is a newly-added user, then, with respect to the users U2 and U3, the decryption keys SK1 and SB1 of the section K1 and the department B1 are encrypted using the encryption key PK1 before update and delivered to the users U2 and U3. Further, with respect to the users U4, U5 and U6, the updated decryption key KB1 is encrypted using the encryption key PB2 of the section K2 and delivered to the users U4, U5 and U6. As for delivery of the decryption keys SK1, SB1 and SU1 to the user U1, it is preferable to deliver those keys directly to the user U1, for example, by delivering by hand an external storage medium 110 that stores the decryption keys 112.

Further, at the time when the decryption keys 112 are delivered to a user in the above processing, it is preferable to authenticate the user so that the decryption keys 112 may not be delivered improperly to another user or the decryption keys 112 may not be leaked illegally to a malicious user.

According to the above-described arrangement, it is possible for the key management apparatus 103 to distribute keys safely to users.

A content encryption method using the above-described key management method will be described in the following.

Figure 8:
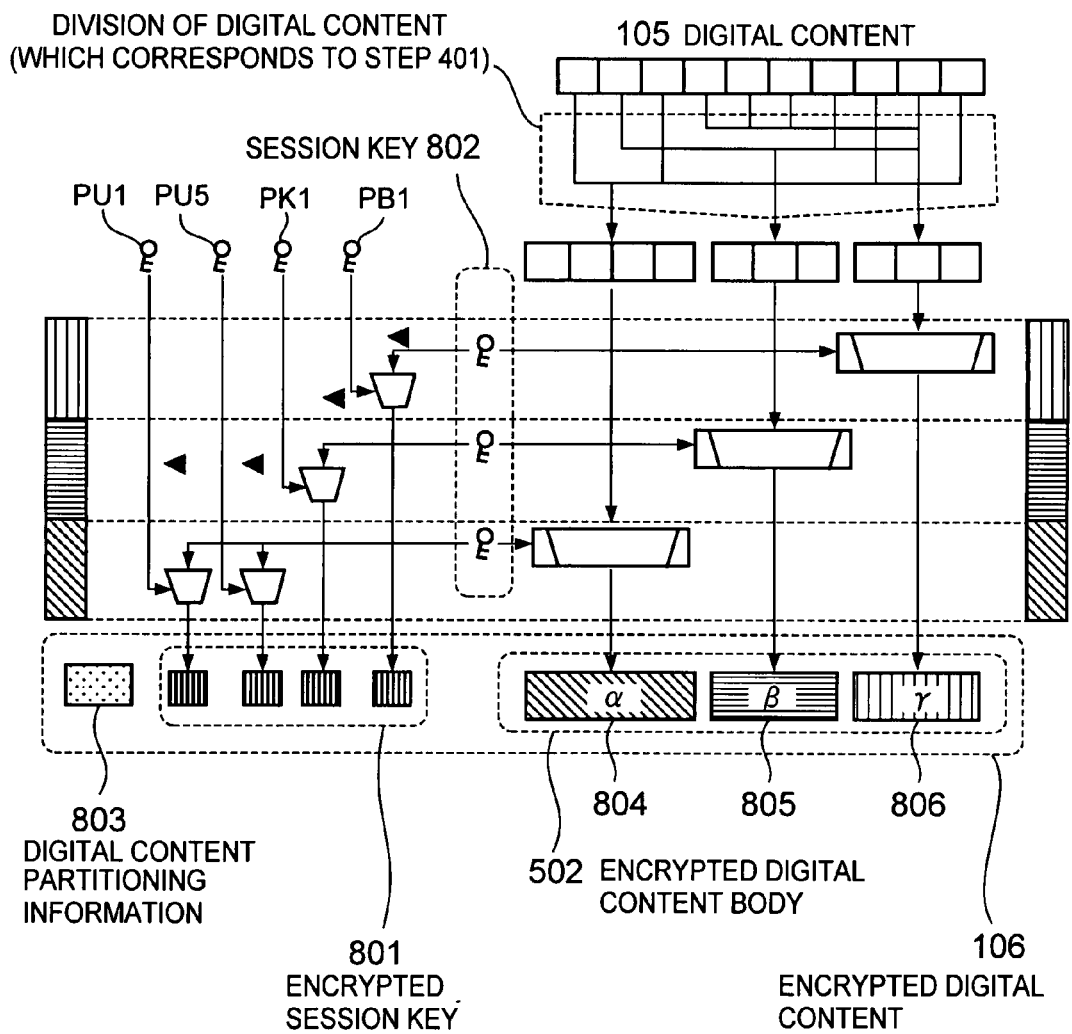
FIG. 8 shows schematically the encryption processing in the first embodiment.

FIG. 8 shows schematically an example of encryption processing for encrypting content 105 by using the key management method shown in FIG. 7. As shown in FIG. 8, the content 105 is divided based on roles of users who can browse respective areas (this corresponds to Step 401). Then, each area is encrypted depending on roles of users who can browse the area (this corresponds to Step 402 through Step 407). As shown in the processing flow of FIG. 4, at the time of encryption, a session key 802 is generated for each area of the content 105, and that area is encrypted using the session key 802. Further, the session key 802 is encrypted using an encryption key 111.

When, as shown in FIG. 8, it is desired to disclose specific information of the same area (the area α in the encrypted content body 502 in FIG. 8) to a plurality of users having different roles, the session key 802 is encrypted using an encryption key corresponding to each role, so that a plurality of encrypted session keys 801 are generated. For example, in the example shown in FIG. 8, the area α 804 of the encrypted content body 502 is disclosed to the users U1 and U5. In that case, each of the encryption keys PU1 and PU5 specific, respectively, to the users U1 and U5 is used to encrypt the session key 802. As a result, the users U1 and U5 can browse the area α of the encrypted content body 502 using the respective decryption keys SU1 and SU5 held by them. On the other hand, the other users cannot decrypt the encrypted session key, and thus cannot browse the encrypted content concerned.

Figure 9:
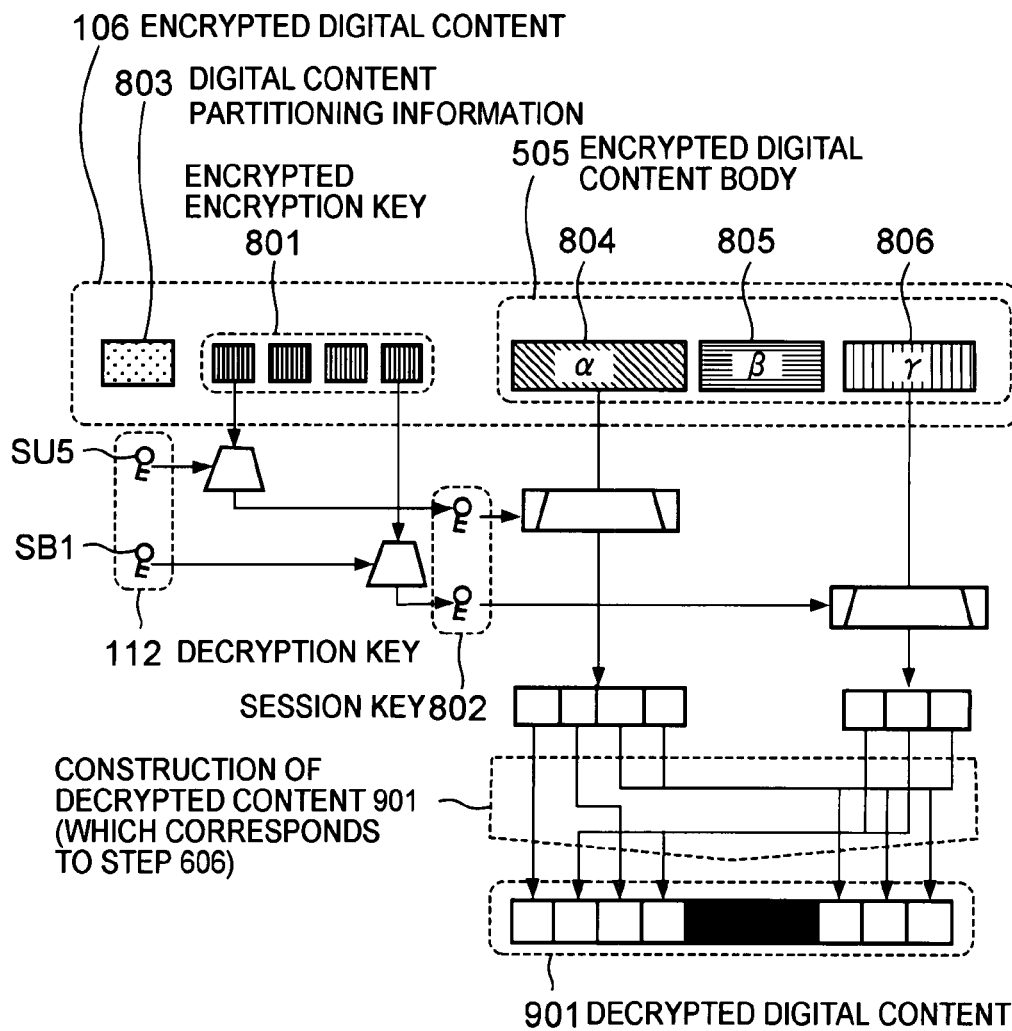
FIG. 9 shows schematically decryption processing in the first embodiment.

FIG. 9 shows schematic processing in the case where the user U5 decrypts the encrypted content 106 of FIG. 8. As shown in FIG. 7, the user U5 holds the decryption keys SU5, SK2 and SB1, and accordingly, the user U5 can decrypt the areas (corresponding to the area α 804 and the area γ 806) encrypted with PU5 and PB1 in FIG. 8. At the time of decryption, the procedure shown in Steps 600-606 in FIG. 8 is followed. Thus, referring to the header 501 of the encrypted content 106 (Step 601), the areas that can be decrypted with the decryption keys held by the user U5 are identified (Step 603). The encrypted session keys 801 are decrypted with the decryption keys 112 (Step 604), and the encrypted partial contents are decrypted with the decrypted session keys 802 (Step 605). Then, the decrypted content 901 is constructed (Step 606).

In FIG. 9, the area blacked out indicates an area that cannot be decrypted in the encrypted content 106 with the decryption keys held by the user U5.

Next, an example of a data expression method and a decrypted content display method in the first embodiment will be described.

FIG. 10 shows an example of a configuration of an encrypted content header 501. FIG. 10 employs XML for using the encrypted content 502. However, XML need not necessarily be employed, and for example, PDF may be employed. In the following, a data format shown using XML in FIG. 10 will be described.

The header 501 of the encrypted content comprises an MRCipher element 1000. The MRCipher element 1000 comprises two elements, an MRCipherParam 1001 element and an MRBlocks element 1003. The MRCipherParam element 1001 is an element for setting parameters used commonly by the encryption PG 216 and the decryption PG for performing encryption processing and decryption processing. For example, the MRCipherParam element 1001 sets a symmetric-key cryptography algorithm used for the encryption of partial contents. Further, the MRBlocks element 1003 describes information required for decrypting each divided content area. In the following, details of the MRCipherParam element 1001 and the MRBlocks element 1003 shown in FIG. 10 will be described.

The MRCipherParam element 1001 comprises an EncryptionAlgorithm element 1002. The EncryptionAlgorithm element 1002 designates the name of the symmetric-key cryptography algorithm used for encrypting content. For example, in cases of using the 128-bit key AES in the CBC mode, "http://www.w3.org/2001/04/xmlenc#aes128-cbc" is described in the Algorithm Attribute of the EncryptionAlgorithm element 1002.

The MRBlocks element 1003 comprises MRBlock elements 1004. An MRBlock element 1004 is an element for describing information required for decrypting each divided content area, and comprises an EncryptedKeyList element 1005, a TargetList element 1009 and a ChiphertextData element 1011.

The EncryptedKeyList element 1005 describes designation of a decryption key 112 used for decrypting a session key 802 and the encrypted session key 801. The decryption key 112 used for decrypting the session key 802 is designated by a Key_id attribute in an EcryptedKey element 1006. To designate the decryption key 112 by the Key_id attribute, it is sufficient to define in advance a unique identifier for each decryption key 112. For example, in the key management method shown in FIG. 7, KB1, KK1 and the like can be used as identifiers.

The EncryptedKey element 1006 comprises two elements, a KeyEncryptionAlgorithm element 1007 and an EncryptedSEKValue element 1008. The KeyEncryptionAlgorithm element 1007 describes an encryption algorithm for decrypting the encrypted session key 801, and the EncryptedSEKValue element 1008 describes a character string obtained by encoding the encrypted session key 801 by the BASE64 encoding.

In the case where a plurality of users having different roles are permitted to browse the same area, a plurality of EncryptedKey elements 1006 are provided in the EncryptedKeyList element 1005.

A target area (for example, an XML element) is designated by the TargetList element 1009. For example, when the target content 105 is an XML document and, for each element, users who can browse the element are limited, then, using XPath or URI, a Target element 1010 in the TargetList element 1009 designates an area (a value of an element) as a target of decryption. In the case where there exist a plurality of areas that can be browsed by users having the same role, a plurality of Target elements 1010 are provided. This becomes the content partitioning information 803 in the case of using an MRCipher element 1000.

According to the format shown in FIG. 10, the encrypted content is described in the CiphertextData element 1011, as a character string encoded by BASE64 encoding. Thus, sometimes it is required to specify which part of the decrypted data corresponds to which element value, as in the case where there exist a plurality of areas (elements) that can be browsed by users having the same role. In that case, for example, an attribute of the Target element 1010 may hold information indicating an attribute of the CiphertextData element 1011 such that the decrypted data corresponds to an element A exits from the n-th byte through the m-th byte. Or, at the time of encryption, not only elements as targets of the encryption but also their lengths are encrypted, so that the decryption apparatus 102 can distinguish which range corresponds to which element at the time of decryption. For example, in the case where encryption should include length information, a target area (element) obtained in the Target element 1010 may be expressed using the BIT STRING type of ASN.1. As a result, the length of the target area becomes definite.

In the case where the field within the CiphertextData element 1011 is used as shown in FIG. 10, then the target area designated by the Target element 1010 may be deleted from the content 105 at the time of encryption (for example, this is performed when Step 405 is executed). Further, at the time of decryption, the target area deleted at the time of the encryption may be restored with content in which the information in the CiphertextData element 1011 is decrypted, in order to compose the decrypted content (this corresponds to Step 606 in FIG. 6).

It is not necessary that the encryption header 501 shown in FIG. 10 be located at the top of the encrypted content 106. Further, a configuration of the header 501 does not need to be same as the one shown in FIG. 10. For example, if the algorithm used for encrypting the session key 802 is obvious from the decryption key 112 designated by the Key_id attribute, then the KeyEncryptionAlgorithm element is not necessary. Further, in FIG. 10, an encrypted data is described in the CiphertextData element 1011. However, a target area for encryption may be replaced by encrypted data. In that case, the CiphertextData element 1011 is not necessary.

Further, at the time of encryption, also the TargetList element 1009 may be encrypted and included in the CipherTextData element 1011. As a result, it is also possible to disclose which area has been encrypted to authorized users only.

The method of realizing the encrypted header 501 is not limited to XML. For example, a data description language such as ASN.1 may be used. Further, although the format shown in FIG. 10 is an original format, a format (for example, the format of XML Encryption) that can express the equivalent of FIG. 10 can be used. XML Encryption is described in detail in the following document: XML Encryption Syntax and Processing W3C Recommendation 10 Dec. 2002, URL: <http://www.w3.org/TR/xmlenc-core/>.

FIG. 11 shows an example of a flow extending from decryption of encrypted content 106 through display on the output unit 206 in the case where the encrypted content 106 is expressed using XML. The encrypted content 106 is inputted to the decryption PG 1101, and decrypted following the processing flow shown in FIG. 6 (or FIG. 9) to be converted to a decrypted content 901. A decrypted content conversion PG 1102 applies a display style definition file 1105 to the decrypted content 901 so as to generate a display image source 1106. This display image source 1106 is used to display the decrypted content 901 on the display unit 205 through a display PG 1103. In FIG. 11, XSLT, XSL and HTML can be used as the decrypted content conversion PG 1102, the display style definition file 1105 and the display image source 1106. The processing on and after XSLT can be performed using an ordinary Web browser, for example.

An area that could not be decrypted in the decryption processing of the encrypted content 106 may be displayed blacked out in a decrypted content display image 107 shown in FIG. 11 as an example. In the example shown in FIG. 11, a table located below Customer Information in the decrypted content display image 107 is displayed blacked out. This means that the user browsing this decrypted content display image 107 does not have a role in browsing the area. The area that could not be decrypted does not need to be blacked out. Another display method may be employed, or the area itself may be left undisplayed.

FIG. 11 shows the case where the encrypted content 106 and the decrypted content 901 are described by XML and the display image source 1106 by HTML. However, this may be changed. For example, in the case where the encrypted content 106 is described in PDF, both the decrypted content 901 and the display image source 1106 can be described in PDF, and the decrypted content conversion PG 1102 can be omitted. Further, there are various methods for implementing the example of FIG. 11. For example, the decryption PG 1101 and the decrypted content conversion PG 1102 may be taken as one program so that direct output of the display image source 1106 follows from input of the encrypted content 106.

From the viewpoint of security, it is preferable that the decrypted content 901 and the display image source 1106 are used in a state that cannot be stored in the external storage 203 or an external storage medium 110.

In workflow, sometimes it is desired that each user who browses content can verify whether the content has been altered or not. In that case, it is desirable to add a digital signature to the encrypted content 106 generated in the encryption apparatus 101. This can ensure completeness of the encrypted content 106. In adding a digital signature, it is preferable to generate a digital signature not only with respect to the encrypted content body 502 but also with respect to all information including additional information such as the decrypted session keys 801.

In the case where a digital signature is added, the external storage 203 of the encryption apparatus 101 stores a digital signature generation PG and a private key to generate a signature of a user. Further, the external storage 203 of a decryption apparatus 102 stores a validation PG and a public key used for validation.

Second Embodiment

As a second embodiment, a case where the present invention is applied to processing flow for an application for a credit card will be described.

Figure 12:
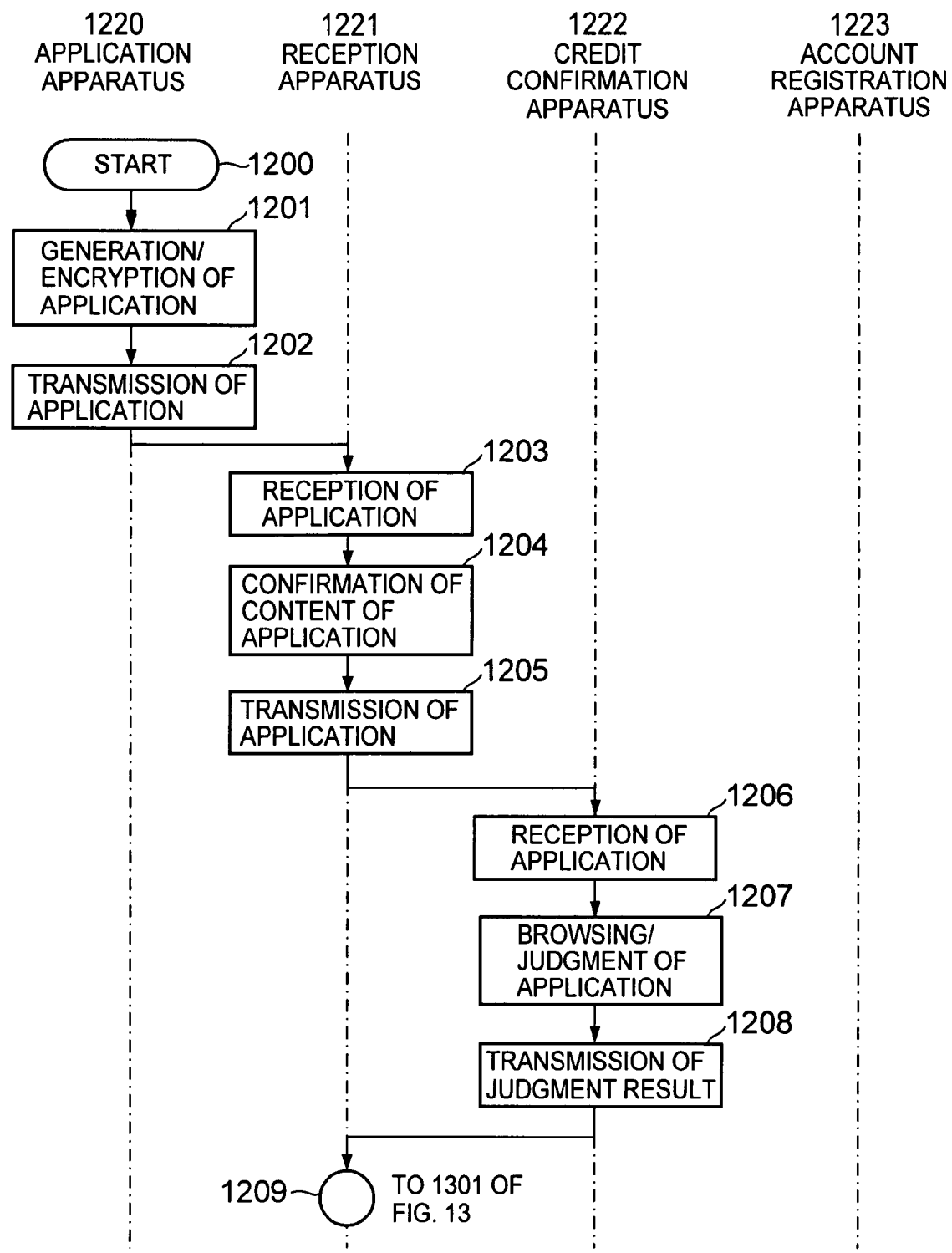
FIG. 12 illustrates an outline of processing flow in a second embodiment of the present invention.
Figure 13:
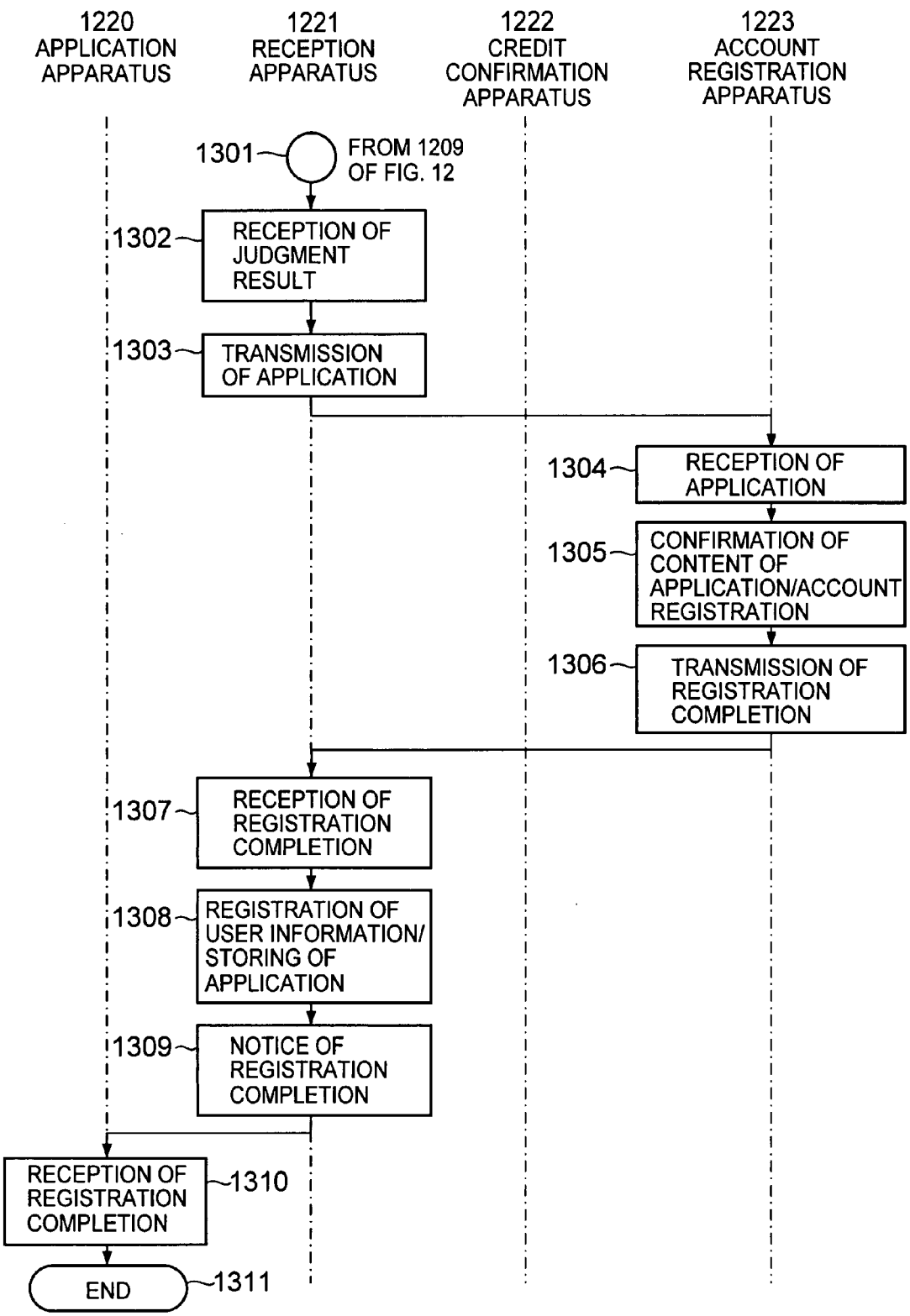
FIG. 13 illustrates an image of content in the second embodiment.

FIGS. 12 and 13 show an example of the processing flow in the case where the present invention is applied to a credit card application. A workflow system according to the present embodiment comprises four apparatuses shown in FIGS. 12 and 13, i.e. an application apparatus 1220, a reception apparatus 1221, a credit confirmation apparatus 1222, and an account registration apparatus 1223, and furthermore a key management apparatus 103 that distributes encryption keys 111 and decryption keys 112 to those apparatuses. Here, the application apparatus 1220 corresponds to the encryption apparatus 101 of FIG. 1, and each of the reception apparatus 1221, the credit confirmation apparatus 1222 and the account registration apparatus 1223 to a decryption apparatus 102 of FIG. 1. The key management apparatus 103 delivers an encryption key 111 to the application apparatus 1220, and decryption keys 112 to the reception apparatus 1221, the credit confirmation apparatus 1222 and the account registration apparatus 1223 depending on their roles. Further, an application corresponds to content 105, and an encrypted application to encrypted content 106. The processing flow is as follows.

1200: Start

1201: An application is generated or read by using a content generation/read processing unit 210 in the application apparatus 1220. Further, a content encryption processing unit 211 encrypts the application.

1202: A content transmission processing unit 212 in the application apparatus 1220 transmits the encrypted application to the reception apparatus 1221.

1203: A content reception unit in the reception apparatus 1221 receives the encrypted application.

1204: A content decryption processing unit in the reception apparatus 1221 decrypts the encrypted application. Further, a content display processing unit displays the decrypted content so that the content of the application can be confirmed by a displayed result.

1205: A content transmission processing unit 212 in the reception apparatus 1221 transmits the encrypted application to the credit confirmation apparatus 1222.

1206: A content reception processing unit in the credit confirmation apparatus 1222 receives the encrypted application.

1207: A content decryption processing unit in the credit confirmation apparatus 1222 decrypts the encrypted application. Further, a content display processing unit displays the decrypted content to browse the content and to judge credit by the displayed result.

1208: The credit confirmation apparatus 1222 transmits the judgment result to the reception apparatus 1221.

1302: The reception apparatus 1221 receives the judgment result from the credit confirmation apparatus 1222.

1303: The content transmission processing unit 212 in the reception apparatus 1221 transmits the encrypted application to the account registration apparatus 1223.

1304: A content reception processing unit in the account registration apparatus 1223 receives the encrypted application.

1305: A content decryption processing unit in the account registration apparatus 1223 decrypts the encrypted application. A content display processing unit displays the decrypted content, and the content of the application is confirmed and an account number is registered.

1306: The account registration apparatus 1223 transmits a notice of completion of account registration to the reception apparatus 1221.

1307: The reception apparatus 1221 receives the notice of completion of account registration.

1308: The content decryption processing unit in the reception apparatus 1221 decrypts the encrypted application. The content display processing unit displays the decrypted content, so that card user information is registered to a database, based on the displayed result. Further, the application is stored.

1309: The reception apparatus 1221 transmits a notice of completion of registration to the application apparatus 1220.

1310: The application apparatus 1220 receives the notice of completion of registration.

1311: End

In FIGS. 12 and 13, the application apparatus 1220, the reception apparatus 1221, the credit confirmation apparatus 1222 and the account registration apparatus 1223 are respectively a computer terminal such as a PC of an application user, a business terminal in a credit card company, a business terminal in an examining agency, a business terminal in a bank, for example. The arrangement of the apparatuses contributing to the above-described processing flow is not limited to the above-described arrangement. For example, in the case where a user submits an application directly at the window of a credit card company, a business terminal in the credit company serves as both the application apparatus 1220 and the reception apparatus 1221.

The encryption of the application in Step 1201 and the decryption of the encrypted application in Steps 1204, 1207, 1305 and 1308 are respectively performed according to the processing of FIG. 4 and FIG. 6 referred to in the first embodiment. The above processing flow extends from application through completion of registration. If, in the course of processing, there occurs a state that prevents registration of a user (such as the case where an error in a registration content is found in Step 1204 of confirming the registration content), then, for example, a notice of a registration failure is sent to the application apparatus 1220 for example, and a request is made to stop the processing or to perform the processing again.

FIG. 14 shows an image of an application used in the present embodiment. An application format can be expressed with XML, for example. The application shown in FIG. 14 is partitioned between items, and encrypted according to the processing of FIG. 4. The column "Area" shown in the table of FIG. 14 indicates a kind of encryption key 111 used for encrypting the corresponding field. (Thus, Applicant's Name, Address, and Date of Birth are encrypted with the same key).

The key management apparatus 103 distributes keys to the application apparatus 1220, the reception apparatus 1221, the credit confirmation apparatus 1222 and the account registration apparatus 1223 as follows.

First, the key management apparatus 103 generates a specific encryption key 111 and a specific decryption key 112 for each of the reception apparatus 1221, the credit confirmation apparatus 1222 and the account registration apparatus 1223. In the following, those keys are expressed as KX=(PX, SX), KY=(PY, SY), and KZ=(PZ, SZ), respectively. Here, PX, PY and PZ are encryption keys 111, and SX, SY and SZ are decryption keys 112. In the following description, the key management apparatus 103 distributes the respective keys to the apparatuses. However, the keys may be distributed to users of the apparatuses, respectively. Further, it is not necessary that the key management apparatus 103 generates those keys.

Next, the encryption keys PX, PY and PZ are delivered to the application apparatus 1220. The keys SX, SY and SZ are delivered to each of the reception apparatus 1221, the credit confirmation apparatus 1222 and the account registration apparatus 1223. It is preferable that delivery of the keys SX, SY and SZ is performed through encrypted communication, or that these keys are stored in a tamper-resistant medium such as an IC card and that the medium is directly delivered to a user of each apparatus.

The encryption of an application in the application apparatus 1220 is performed as follows. First, with respect to the areas A, B, C and D shown in FIG. 14, session keys 802 are generated with a random number generator or the like. Next, the generated session keys are encrypted with the respective encryption keys 111 of the apparatuses. Here, the session key for the area A is encrypted with each of PX, PY and PZ separately. Further, the session key for the area B is encrypted with each of PX and PZ separately, the session key for the area C with each of PX and PY, and the session key for the area D with PX. Thus, the encrypted session keys 801 are generated.

As a result, for example, the credit confirmation apparatus 1222 can browse the areas A and C that can be decrypted using the decryption key SY, and the account registration apparatus 1223 can browse the areas A and B that can be decrypted using the decryption key SZ.

FIG. 15 shows an example of a display image of the decrypted application (which corresponds to the decrypted content display image 107) that is browsed by the account registration apparatus 1223. As shown in FIG. 15, information unnecessary for account registration (such as Annual Income, Secret Code Number and the like) cannot be decrypted by the account registration apparatus 1223, and thus is displayed being blacked out. Similarly, information unnecessary for credit confirmation (such as ID, Secret Code Number and the like) in the credit confirmation apparatus 1222 is encrypted so that the information cannot be displayed (decrypted) on the credit confirmation apparatus 1222.

In the above example, the keys (roles) are assigned, paying attention to each apparatus (or its user). In the present embodiment, however, the keys (roles) may be assigned, paying attention to the area in an application. In that case, distribution of encryption keys 111 and decryption keys 112 and encryption in the application apparatus 1220 are performed as follows.

First, the key management apparatus 103 generates an encryption key 111 and a decryption key 112 for each of the areas A, B, C and D. These are expressed as KA=(PA, SA), KB=(PB, SB), KC=(PC, SC) and KD=(PD, SD), respectively. Here, SA, SB, SC and SD are decryption keys 112, and PA, PB, PC and PD are encryption keys 111 corresponding to respective decryption keys.

Further, the key management apparatus 103 opens the above-generated encryption keys PA, PB, PC and PD to the public, so that the application apparatus 1220 can obtain those encryption keys. Further, the key management apparatus 103 delivers the decryption keys SA, SB, SC and SD to the reception apparatus 1221, the decryption keys SA and SC to the credit confirmation apparatus 1222, and the decryption keys SA and SB to the account registration apparatus 1223.

Here, it is not necessary that decryption keys 112 are delivered directly to each of the reception apparatus 1221, the credit confirmation apparatus 1222 and the account registration apparatus 1223. Decryption keys 112 may be sent to a user of each apparatus. Further, it is preferable that the decryption keys 112 are delivered through encrypted communication, or that these keys 112 are stored in a tamper-resistant medium such as an IC card and that the medium is delivered directly to a user of each apparatus.

The encryption of an application is performed as follows. First, session keys 802 are generated for the areas A, B, C and D, respectively, with a random number generator or the like. Next, the session keys generated for the areas A, B, C and D are encrypted using the encryption keys PA, PB, PC and PD, respectively and an encrypted content 106 is generated.

According to the above-described key management method and encryption method, it is possible to realize functions similar to those in the case where one decryption key 112 is assigned to each of the above apparatuses. For example, the account registration apparatus 1223 holds the decryption keys SA and SB, and thus can decrypt the areas A and B. Accordingly, the account registration apparatus 1223 can browse the area A (ID, Applicant's Name, Address, and Date of Birth) and the area B (Bank Account Number). Thus, the decrypted content display image 107 shown in FIG. 15 can be obtained.

The present key management method requires delivery of a plurality of decryption keys 112 to each apparatus. However, in comparison with the above-mentioned method of delivering one decryption key to each apparatus, data size of the decrypted content 106 can be reduced.

The above-described procedure (Steps 1200 through 1208 and Steps 1302 through 1308) can realize a workflow that does not require centralized management of an application database. In the present system, the application apparatus 1220, the reception apparatus 1221, the credit confirmation apparatus 1222 and the account registration apparatus 1223 can disclose suitable information in accordance with the user's role at the destination, for example by transmitting encrypted data via E-mail or the like. In addition to this, the present embodiment can be applied to a one-stop service for reservation of accommodation or the like at a travel agency, flow for processing an application for opening of a bank account, or the like. Here, "one-stop service" means a service that can complete a plurality of procedures by one process when those procedures are required.

For example, the one-stop service for reservation at a travel agency is realized as follows. A system for the one-stop service comprises a key management apparatus 103, a reception apparatus (which corresponds to the encryption apparatus 101) in a travel agency, a plurality of reservation registration apparatuses (which correspond to the decryption apparatuses 102) in accommodations, airline companies, or the like. The key management apparatus 103 sends encryption keys 111 to the reception apparatus, and distributes decryption keys 112 to the reservation registration apparatuses. The travel agency transmits an application to accommodations and airline companies through the reception apparatus. At that time, by performing encryption processing similarly to the above embodiment, suitable information disclosure in each reservation registration apparatus can be realized.

In the case of a processing flow for opening a bank account, a system comprises a key management apparatus 103, a reception apparatus (which corresponds to the encryption apparatus 101), and a plurality of approval apparatuses (decryption apparatuses) 102. Similarly to the above, the key management apparatus distributes encryption keys 110 to the reception apparatus and decryption keys 111 to the approval apparatuses. The reception apparatus encrypts an application and sends the encrypted application to the approval apparatuses. Each approval apparatus selectively discloses the application using the decryption key 111 corresponding to its role, determines approval or disapproval of the account registration, and sends the application to another approval apparatus. At that time, when the reception apparatus performs encryption processing similarly to the above embodiment, suitable information disclosure corresponding to the role of each approval apparatus (approver) can be realized.

Similarly to the first embodiment, also in the second embodiment, by adding a digital signature to an encrypted application, manipulation of the encrypted application can be detected. Thus, alteration of an application can be prevented.

Third Embodiment

According to the first and second embodiments, it is possible to disclose content partially depending on users, and as a result a workflow system can be constructed.

However, encryption processing in the first and second embodiments does not control order, i.e. which user is permitted to browse first in order. The third embodiment describes an encryption method that can control order of users who perform decryption and a decryption method employed by those users. According to this embodiment, content cannot be browsed in any order other than a regular order, even when the content is received by users in an order other than the regular order owing to an illegal or mistaken processing flow. As a result, execution of an illegal or mistaken processing flow can be prevented.

Figure 16:
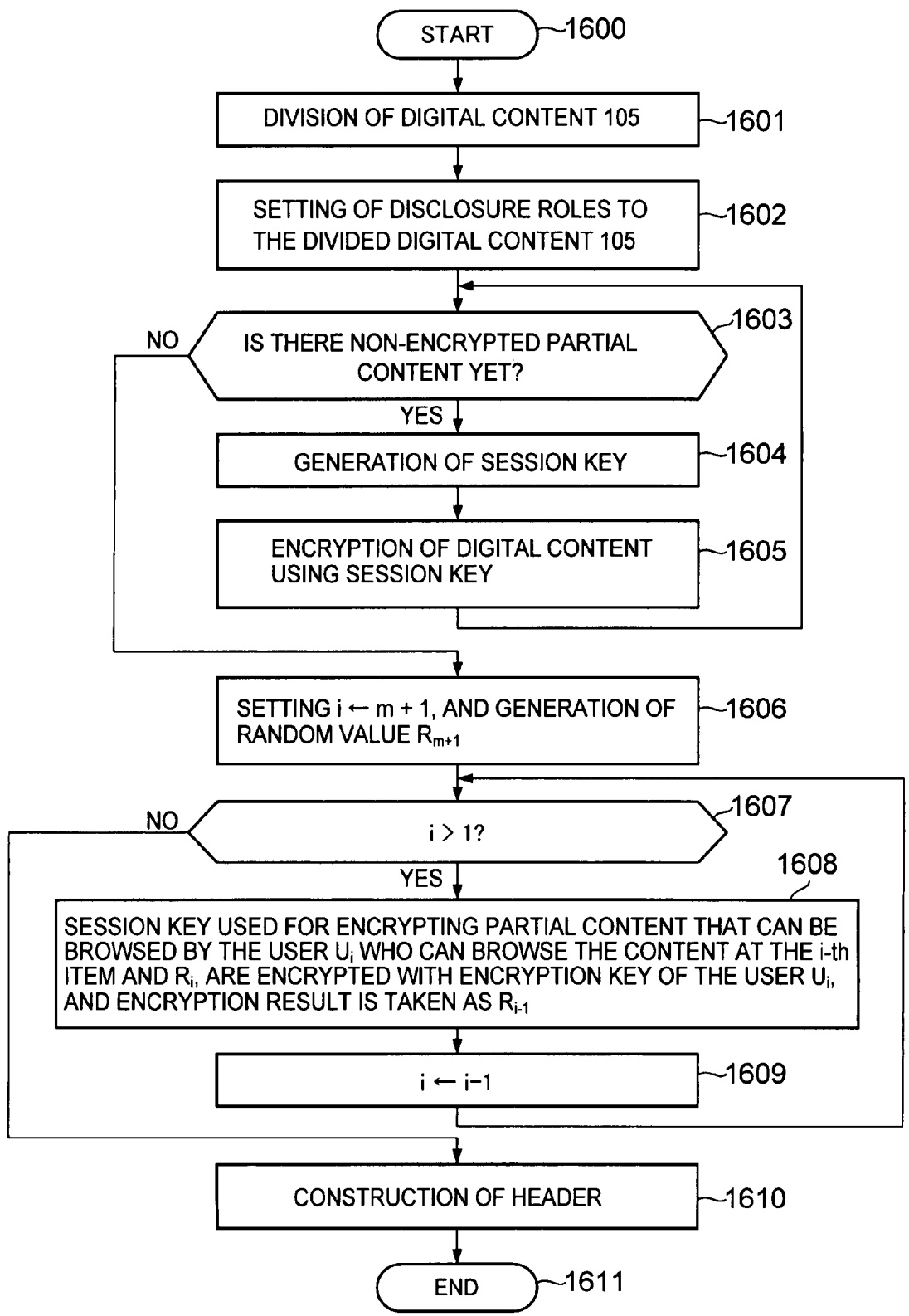
FIG. 16 illustrates an outline of encryption processing in a third embodiment of the present invention.

FIG. 16 shows an outline of encryption processing according to the present embodiment. In the following, this outline of the encryption processing will be described. In the following description, a user who browses content at the i-th item is expressed as $U_i$, and it is assumed that the content is browsed by m users $(U_1, \ldots, U_m)$ in the order of $U_1 \rightarrow U_2 \rightarrow \ldots \rightarrow U_m$.

1600: Start

1601: The content 105 is divided into partial contents. (This corresponds to Step 401).

1602: Disclosure role is set for each part of the divided content 105 (This corresponds to Step 402).

1603: If there exists partial content that has not been encrypted yet, then go to Step 1604. Otherwise go to Step 1606. (This corresponds to Step 403).

1604: Generation of a session key. (This corresponds to Step 404).

1605: The session key is used to encrypt the target partial content, and then go to Step 1603.

1606: i is set to (m+1), and an order control random value $R_{m+1}$ is generated.

1607: If i>1, then go to Step 1608. Otherwise go to Step 1610.

1608: The session key used for encrypting partial content that can be browsed by the user $U_i$ who browses the content at the i-th item is concatenated to the order control random value $R_i$, the concatenated result is encrypted using the encryption key of the user $U_i$, and the encrypted result is taken as $R_{i-1}$.

1609: After decrementing i←(i−1), the flow proceeds to Step 1606.

1610: Construction of a header 501 (This corresponds to Step 407)

1611: End

In the process of Step 1602, setting of a disclosure role may be performed using a configuration file in which the browsing order of the users and the respective areas that can be browsed by the users have been written previously.

In the process of Step 1608, the session key is concatenated to the order control random value $R_i$ before the encryption processing is performed. The order control random value $R_i$ is further encrypted by the encryption key 111 of the user $U_{i-1}$. Accordingly, the user $U_i$ can know $R_i$ on condition that the user $U_{i-1}$ decrypts $R_{i-1}$. As a result, the user $U_i$ can browse the encrypted content 106 after the user $U_{i-1}$ finishes browsing it.

In the process of Step 1608, the session key is concatenated to the order control random value $R_i$ before the encryption. This may be changed. For example, a secret key in a symmetric-key cryptography may be generated from the order control random value $R_i$ by using a hash function or the like. This secret key is used for encrypting the session key, and further, $R_i$ is encrypted using the encryption key 111 of the user $U_i$.

In that case, the order control random value $R_{i-1}$ of the user $U_{i-1}$ may be obtained by encrypting $R_i$ using the encryption key 111 of the user $U_i$ and then concatenating the encrypted result to the encrypted session key, or, only the encrypted $R_i$ may be defined as $R_{i-1}$.

At that time, not only the secret key in the symmetric-key cryptography but also a key for generating Message Authentication Code (MAC) may be generated from $R_i$ in order to generate MAC for the session key. It is useful to confirm at the time of decryption whether the session key has been correctly decrypted or not.

Figure 17:
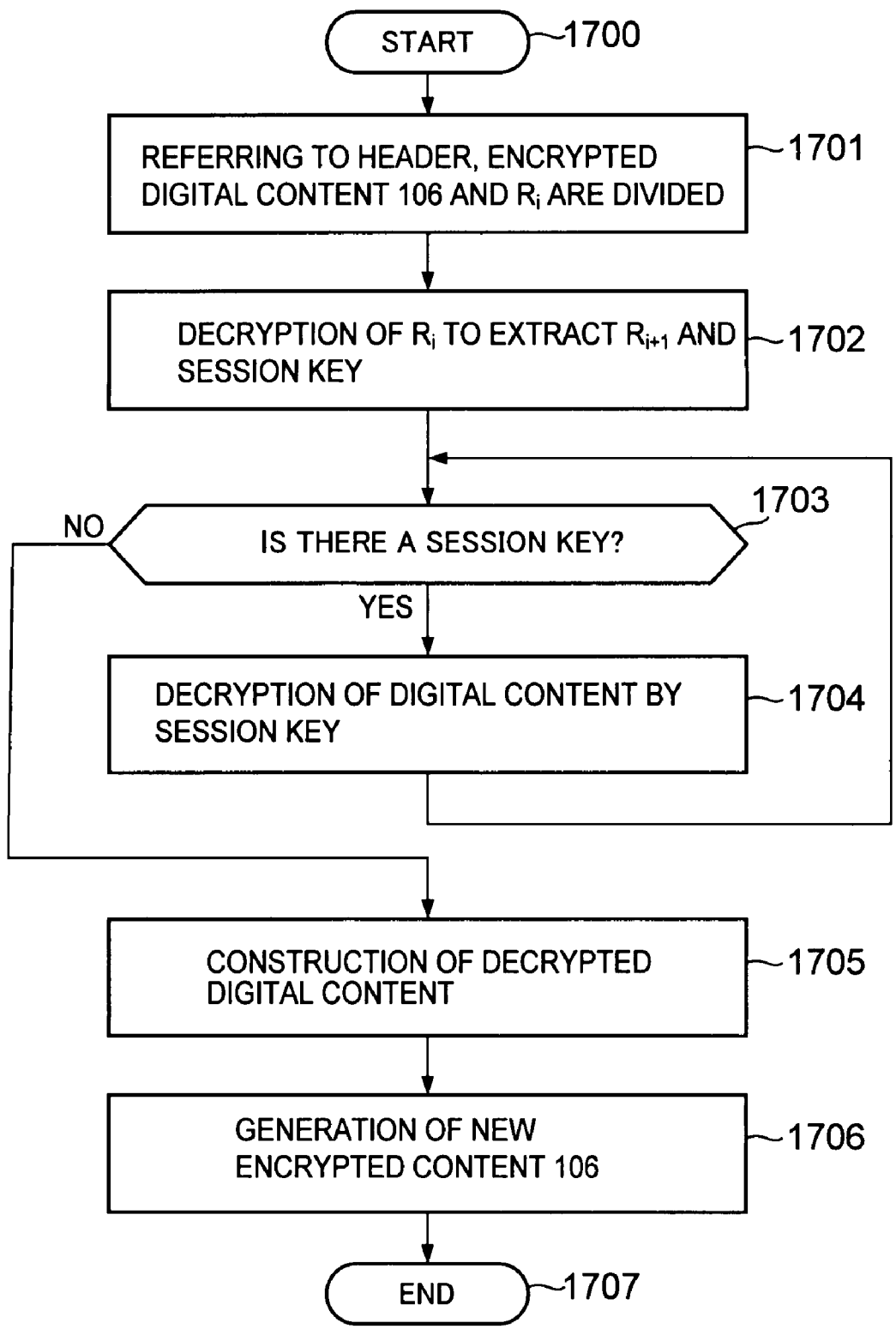
FIG. 17 illustrates an outline of decryption processing in the third embodiment.

FIG. 17 shows an outline of decryption processing of the encrypted content 106 encrypted by the encryption processing of FIG. 16. In the following, it is assumed that the user $U_i$ decrypts the encrypted content 106.

1700: Start

1701: Referring to the header 501, the encrypted content 106 is divided to extract the encrypted partial contents and the random control value $R_i$ (This corresponds to Step 601).

1702: $R_i$ is decrypted with the decryption key 112 of the user $U_i$, and $R_{i+1}$ and a session key is extracted.

1703: If there exists a session key extracted in Step 1702, then go to Step 1704. Otherwise go to Step 1705.

1704: A partial content is decrypted with the corresponding session key, and then go to Step 1703. (This corresponds to Step 605).

1705: The decrypted content is constructed from one or more decrypted partial contents obtained by Step 1704. (This corresponds to Step 606).

1706: $R_i$ is deleted from the encrypted content 106, and $R_{i+1}$ is added to the encrypted content 106. The header 501 is constructed again, and a new encrypted content 106 is generated.

1707: End

In the process of Step 1706, $R_i$ is deleted from the encrypted content 106, and instead $R_{i+1}$ is added to the encrypted content 106. $R_{i+1}$ can be decrypted with the decryption key 112 of the user $U_{i+1}$, and the decryption result includes information of the session key for decrypting the encrypted partial content. Owing to the process of Step 1706, it becomes possible for the user $U_{i+1}$ to browse the encrypted content 106.

In the encryption processing shown in FIG. 16, it is assumed that there is one user $U_i$ who browses the i-th item. However, a plurality of such users may exist. In that case, n users at the i-th item are expressed as $U_i^1, U_i^2, \ldots, U_i^n$. It is then possible to perform threshold processing such that the (i+1)-th user $U_{i+1}$ can browse the content if k users among the n users $U_i^1, U_i^2, \ldots, U_i^n$ browse the content, as described in the following.

That is, the threshold secret sharing processing is applied to the order control random value $R_i$ before encrypting $R_i$ (Step 1608), to generate $R_i^1, \ldots, R_i^n$. Considering each of these $R_i^1, \ldots, R_i^n$ as the order control random value $R_i$, the process of Step 1608 is performed separately to generate $R_{i-1}^1, \ldots, R_{i-1}^n$. Next, data obtained by concatenating these $R_{i-1}^1, \ldots, R_{i-1}^n$ is taken as $R_{i-1}$. Thereafter, Step 1609 and the following steps are performed.

When the decryption apparatus 102 decrypts the encrypted content 106, the decryption apparatus 102 extracts $R_i^j$ from the received encrypted content 106, according to the processing of Step 1701. In the case where the decryption apparatus 102 obtains k or more $R_i^j$ (i.e. receives k or more encrypted contents 106), $R_i$ can be restored by inverse transform processing of the threshold secret sharing processing. Then, using $R_i$, the processing on and after Step 1702 can be performed.

As the threshold secret sharing processing, various processing methods have been proposed. For example, the following document is known.

Adi Shamir, "How to share a secret", Communications of the ACM, 22(11), pp. 612-613, November, 1979.

In the following, an example of a method of generating $R_i^1, \ldots, R_i^m$ by applying the threshold secret sharing processing to $R_i$ is described.

First, the encryption apparatus 101 performs the following processing before performing Step 1608. That is, $R_i$ is taken as $a_0$, and $a_1, \ldots, a_k$ are generated using a random number generator. Then, $f(x)$ is defined as $f(x)=a_0+a_1X+a_2X^2+\ldots+a_kX^k$, and $R_i^1, \ldots, R_i^m$ are calculated from $R_i^j=f(j)$ (j=1, \ldots, m).

Next, an outline of processing in the decryption apparatus 102 will be described in the case where the above-generated $R_i^1, \ldots, R_i^m$ are used for encryption processing. Here, it is assumed that the order control random values $R_i^{j1}, \ldots, R_i^{jk'}$ (k'>k) are included in the encrypted contents 106 received by the user $U_i$.

The decryption apparatus 102 obtains $R_i^X$ from the plurality of encrypted contents 106 by the processing of Step 1701 of the decryption processing. Before the processing of Step 1703, $R_i = \Sigma_{(j=j1,\ldots,jk')} R_i^j \pi_{(l=j1,\ldots,jk',\,l\neq j)}(-1)/(j-1)$ is calculated. Here, $\Sigma_{(i)} x_i$ and $\pi_{(i)} x_i$ mean calculation of the sum and the product of all $x_i$ having a subscript number in ( ), respectively. Thus, $R_i$ is obtained, and then this $R_i$ is decrypted using the decryption key 112 of the user $U_i$ to extract $R_{i+1}$ and a session key. (This corresponds to Step 1702). Then, the processing on and after Step 1703 is performed.

In the above processing, the threshold secret sharing processing is employed so that the user $U_{i+1}$ can browse the decrypted content 106 if k users out of n users $U_i^1, U_i^2, \ldots, U_i^n$ browse the content. Also, it can be arranged such that the user $U_{i+1}$ can browse the content only after all n users $U_i^1, U_i^2, \ldots, U_i^n$ browse the content.

To realize this, it is sufficient to replace the above-mentioned threshold secret sharing processing by the All Or Nothing Transform (AONT) processing. As the AONT, several methods have been proposed. For example, the following document is known.

R. Rivest, "All-Or-Nothing encryption and the package transform", Fast Software Encryption '97, Lecture Notes in Computer Science, LNCS. 1267, pp. 210-218, Springer-Verlag, 1997.

According to the above encryption processing (Steps 1600-1611) and the decryption processing (Steps 1700-1707), it is possible to control the browsing order. Here, after the end of the encryption processing or the decryption processing, the encryption apparatus 101 or the decryption apparatus 102 transmits the encrypted content 106 to the next decryption apparatus 102 to browse the content.

Here, in the case where the threshold processing is performed, e.g., the above-mentioned threshold secret sharing processing, it is sufficient that the user $U_i$ before the threshold processing transmits the encrypted content 106 to the users $U_{i+1}^1, \ldots, U_{i+1}^m$ who are permitted to browse the content next.

Further, in the case where the encrypted content 106 has been transmitted to a different decryption apparatus 102 by mistake, the decryption apparatus 102 that has received the encrypted content 106 sends the encrypted content 106 back to the decryption apparatus 102 that has sent the encrypted content 106 (or to the encryption apparatus 102). Or, the encrypted content 106 may be transmitted to the decryption apparatus 102 that should properly receive it.

In order that the decryption apparatus 102 can judge whether it has received the encrypted content 106 in the correct order, it is sufficient that the header 501 of the encrypted content 106 explicitly describes the decrypting order.

For example, in the case of employing XML shown in FIG. 10, it is sufficient that the EncryptedKey elements 106 are arranged in the browsing order, or, the EncryptedKey elements 106 may be each added with an attribute (for example, DecryptedOrder attribute) indicating the browsing order.

In that case, it is possible that the MRBlock elements 1004 other than the MRBlock element 1004 for the user who can browse the content next are encrypted and the TargetList element 1009 of the MRBlock element 1004 for that user is made to include those MRBlock elements 1004 for the following users (in other words, the MRBlock elements 1004 for the following users are encrypted), so that the users other than the user who next browse the content cannot know the browsing order.

Additionally, as described above, MAC of the session key may be generated at the time of encrypting the session key in the encryption processing Step 1608, for example. Then, by using this MAC for confirming whether the session key has been correctly decrypted, it is possible to confirm whether the decrypted content 106 has been received in the correct order (i.e. whether the decrypted content 106 can be browsed in the correct order).

The above-described embodiments may be combined. For example, at the time of the encryption in the second embodiment, the method described in the third embodiment may be employed.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. A digital content encryption method, wherein:
    an encryption apparatus is configured to:
        divide digital content into a plurality of partial contents;
        respectively assign a different set of encryption keys to each of the partial contents according to a public-key cryptography associated with users permitted to browse the partial contents;
        generate session keys which are different from one another for the partial contents generated by the division;
        generate encrypted partial contents by encrypting each of the partial contents with the session keys generated for each of the partial contents;
        encrypt the session keys used to encrypt the partial contents by using the assigned encryption keys; and
        output encrypted digital content comprising:
            a plurality of encrypted partial contents;
            encrypted session keys; and
            a content partitioning information; and
        each of the encrypted partial contents in the encrypted digital content is associated with the content partitioning information that indicates a dividing position in the digital content and at least a corresponding one of the encrypted session keys.

2. A digital content encryption method according to claim 1, wherein:
    a common user is assigned to the plurality of partial contents which is permitted to browse by the user.

3. A digital content encryption method according to claim 1, wherein:
    when an inclusive relation between a user and the plurality of partial contents is expressed by associating the user with a leaf of a tree and by associating the plurality of partial contents to which the user belongs with a node or a root of the tree, a key management apparatus assigns a respectively different encryption key and a respectively different decryption key corresponding to the encryption key to each of the leaf, the node and the root;
    different decryption keys assigned respectively to a leaf corresponding to one user, a root, and nodes existing on a path connecting the leaf and the root, are delivered as decryption keys to the user corresponding to the leaf; and
    the encryption keys corresponding to the decryption keys delivered to the user are made public as encryption keys corresponding to the decryption keys.

4. A digital content encryption method according to claim 1, wherein:
    the encryption apparatus generates a digital signature corresponding to the plurality of encrypted partial contents, or to the encrypted partial contents and the plurality of encrypted session keys.

5. A digital content decryption method for digital content that has been encrypted according to the method of claim 1, wherein:
    a decryption apparatus searches session keys encrypted by an encryption key corresponding to a decryption key, provided from any user to the decryption apparatus;
    in case that at least one of the session keys encrypted by the encryption key corresponding to the decryption key is found, the at least one of the encrypted session keys is decrypted by the decryption key corresponding to the encryption key;

each of the decrypted session keys is used to decrypt the partial content that has been encrypted with the session key; and the decrypted partial content is displayed and partial content that is not decrypted by the session key is displayed in a blacked out manner.

6. A digital content decryption method for digital content that has been encrypted according to claim 5, wherein:

the decryption apparatus validates the given digital signature to examine whether the encrypted digital content has been altered or not.

7. A digital content decryption method for digital content that has been encrypted according to the method of claim 5, wherein:

the decryption apparatus generates a display image source from the decrypted digital content so that areas decrypted are displayed and areas not decrypted are blacked out.

8. An encryption method according to claim 1, wherein:

the encryption apparatus constructs, for each user, a session key set including at least one of the session keys used for encrypting respective partial contents that can be browsed by the user; and the encryption apparatus encrypts the session key set for each user, using the encryption key according to the public-key cryptography, assigned to each user.

9. An encryption method according to claim 8, wherein:

the encryption apparatus generates an order control random value for a first user;

the encryption apparatus encrypts a first session key set constructed for the first user and the order control random value generated for the first user, using an encryption key according to the public-key cryptography assigned to the first user; and a result of the encryption of the first session key set is taken as an order control random value for a second user to encrypt a second session key set for the second user that is different from the first session key set.

10. A decryption method corresponding to the encryption method according to claim 9, wherein:

a decryption apparatus:

decrypts the order control random value of the second user, using a decryption key provided from the second user to the decryption apparatus;

divides a result of the decryption into the order control random value of the first user and the second session key set;

decrypts encrypted partial contents that have been encrypted with session keys obtained from the second session key set; and generates encrypted digital content from the order control random value of the first user and plurality of the encrypted partial contents.

11. An encryption method according to claim 9, wherein:

a plurality of second order control random values are generated by applying threshold secret sharing processing to the order control random value;

the session keys are encrypted with respect to each of the second order control random values; and a set of results of the encryption of the session keys is taken as the order control random value for the second user.

12. A workflow system comprising an encryption apparatus and a plurality of decryption apparatuses, wherein:

the encryption apparatus is configured to:

divide digital content into a plurality of partial contents;

assigns a different set of encryption keys to each of the partial contents according to a public-key cryptography associated with users permitted to browse the partial contents;

generate session keys different from one another for each of the partial contents, respectively, encrypt each of the partial contents with the generated session key, to generate the encrypted partial contents;

encrypt the session keys used to encrypt the encrypted partial contents with the encryption keys assigned to the partial contents; and output encrypted digital content comprising:

a plurality of encrypted partial contents;

encrypted session keys a content partitioning information;

each of the encrypted partial contents in the encrypted digital content is associated with the content partitioning information that indicates dividing position in the digital content and at least one of a corresponding one of the encrypted session keys; and each of the decryption apparatuses comprises means configured to:

search one or more encrypted session keys that have been encrypted with an encryption key corresponding to a decryption key that is provided from a user to the decryption apparatus;

in a case that at least one of the encrypted session keys is found, decrypt the encrypted session keys that are found by the decryption key;

decrypt the partial content, which has been encrypted with the corresponding session key, with the session key that is decrypted by the decryption key; and transmit the encrypted digital content to another decryption apparatus.

13. A workflow system according to claim 12, further comprising:

a key management apparatus configured for distributing decryption keys to the decryption apparatuses depending on users of the decryption apparatuses, wherein the key management apparatus comprises means which makes public encryption keys corresponding to the decryption keys, available to the encryption apparatus.

14. A workflow system according to claim 12, wherein:

the encryption apparatus is configured for giving a digital signature to the encrypted digital content; and each of the decryption apparatuses is configured for examining whether the digital content has been altered or not, by validating the encrypted digital content given the digital signature.

* * * * *